(12) United States Patent
McCormick

(10) Patent No.: US 12,495,035 B2
(45) Date of Patent: Dec. 9, 2025

(54) DIGITAL DATA PASSPORT AND VISA CREDENTIALING FOR DATA AUTHORIZATION

(71) Applicant: Evernorth Strategic Development, Inc., St. Louis, MO (US)

(72) Inventor: Jeffrey R. McCormick, Cheshire, CT (US)

(73) Assignee: Evernorth Strategic Development, Inc., St. Louis, MO (US)

( * ) Notice: Subject to any disclaimer, the term of this patent is extended or adjusted under 35 U.S.C. 154(b) by 234 days.

(21) Appl. No.: 18/219,257

(22) Filed: Jul. 7, 2023

(65) Prior Publication Data

US 2024/0283784 A1    Aug. 22, 2024

Related U.S. Application Data

(63) Continuation-in-part of application No. 18/112,177, filed on Feb. 21, 2023.

(51) Int. Cl.
*H04L 9/40* (2022.01)

(52) U.S. Cl.
CPC .......... *H04L 63/083* (2013.01); *H04L 63/107* (2013.01); *H04L 63/20* (2013.01)

(58) Field of Classification Search
CPC ...... H04L 63/083; H04L 63/107; H04L 63/20
See application file for complete search history.

(56) References Cited

U.S. PATENT DOCUMENTS

| | | | |
|---|---|---|---|
| 5,659,616 A * | 8/1997 | Sudia | G06Q 20/3821 380/30 |
| 6,367,013 B1 * | 4/2002 | Bisbee | H04L 63/12 713/176 |
| 7,693,851 B2 | 4/2010 | Becker | |
| 8,875,166 B2 * | 10/2014 | Plewnia | G06F 21/335 725/5 |
| 8,914,323 B1 * | 12/2014 | Allen | G06F 16/245 707/623 |
| 9,262,200 B2 | 2/2016 | Buck | |
| 9,282,122 B2 | 3/2016 | Cabrera | |
| 9,292,454 B2 | 3/2016 | Stairs | |
| 9,411,973 B2 | 8/2016 | Factor | |
| 9,413,680 B1 * | 8/2016 | Kusters | H04L 67/146 |
| 9,612,861 B2 | 4/2017 | Buck | |
| 9,646,019 B2 | 5/2017 | Factor | |

(Continued)

*Primary Examiner* — Jason Chiang
(74) *Attorney, Agent, or Firm* — Miller Johnson

(57) ABSTRACT

A computerized method includes receiving, from a user, a request to perform an operation on data stored in a shared data resource, which stores physically integrated data from multiple tenants. The method includes obtaining a credential document from the user that includes a session portion that is specific to a current session of the user and a set of restriction criteria. The method includes determining, using user attributes in the credential document, a set of tenants whose data the user is authorized to access; evaluating, based on the session portion, whether the set of restriction criteria restricts the user from performing the operation; and in response to the evaluating identifying that the user is not restricted from performing the operation, performing the operation on a subset of the shared data resource. The subset is limited to data stored in the shared data resource that corresponds to the set of tenants.

19 Claims, 14 Drawing Sheets

(56) References Cited

U.S. PATENT DOCUMENTS

| | | |
|---|---|---|
| 9,691,041 B2 | 6/2017 | Grignon |
| 9,697,052 B2 | 7/2017 | Dipol |
| 9,900,350 B2 | 2/2018 | Roth |
| 10,021,143 B2 | 7/2018 | Cabrera |
| 10,091,230 B1 * | 10/2018 | Machani ............... H04L 67/306 |
| 10,298,589 B2 * | 5/2019 | Cleaver ............... H04L 63/102 |
| 10,432,635 B2 | 10/2019 | Simone |
| 10,496,948 B1 * | 12/2019 | Liang .................... G06F 16/248 |
| 10,506,471 B2 | 12/2019 | Samdanis |
| 10,819,702 B2 | 10/2020 | Buck |
| 10,834,137 B2 | 11/2020 | Pitre |
| 10,873,582 B2 | 12/2020 | Gupta |
| 10,936,078 B2 | 3/2021 | Roth |
| 10,970,417 B1 * | 4/2021 | Gulsen ................. H04L 9/0643 |
| 11,134,058 B1 * | 9/2021 | Sole ...................... G06F 21/554 |
| 11,457,040 B1 * | 9/2022 | Sole ...................... H04L 63/101 |
| 12,058,129 B2 * | 8/2024 | Palanisamy ........... G16B 50/30 |
| 12,278,820 B1 * | 4/2025 | Osterkamp .......... H04L 63/102 |
| 2002/0116647 A1 * | 8/2002 | Mont .................... H04L 63/102 726/6 |
| 2002/0138735 A1 * | 9/2002 | Felt ....................... H04L 9/3247 713/176 |
| 2003/0229792 A1 * | 12/2003 | Baldwin ................. G06F 21/33 713/185 |
| 2009/0119149 A1 * | 5/2009 | Leonard .................. G16Z 99/00 726/4 |
| 2009/0187440 A1 * | 7/2009 | Sreevas ................. G06Q 10/00 705/75 |
| 2009/0328138 A1 * | 12/2009 | Lee ........................ G06Q 10/10 726/1 |
| 2012/0144454 A1 * | 6/2012 | Lee ..................... G06F 21/6218 726/4 |
| 2012/0233705 A1 * | 9/2012 | Boysen .................. G06F 21/77 726/29 |
| 2013/0219181 A1 * | 8/2013 | Schwarz ............. H04L 63/0823 713/175 |
| 2013/0283350 A1 * | 10/2013 | Afek .................. G06F 21/6218 726/4 |
| 2013/0318589 A1 * | 11/2013 | Ford ........................ H04L 63/10 726/7 |
| 2014/0020070 A1 * | 1/2014 | Angal ..................... H04L 63/10 726/5 |
| 2014/0068257 A1 * | 3/2014 | Burckard ................. G06Q 50/06 713/166 |
| 2014/0279839 A1 | 9/2014 | Balzar |
| 2014/0330869 A1 * | 11/2014 | Factor ................ G06F 21/6281 707/783 |
| 2015/0106884 A1 | 4/2015 | Shalom |
| 2016/0142216 A1 * | 5/2016 | Turner .................... H04L 9/006 713/156 |
| 2017/0288877 A1 * | 10/2017 | Abt, Jr. ............... H04L 63/0435 |
| 2017/0331832 A1 * | 11/2017 | Lander .................. H04L 63/102 |
| 2017/0351536 A1 | 12/2017 | Kamalakantha |
| 2018/0152340 A1 * | 5/2018 | Johnson ................. H04L 41/40 |
| 2018/0173906 A1 * | 6/2018 | Rodriguez ........... G06Q 50/265 |
| 2018/0262510 A1 * | 9/2018 | Su ........................ G06F 21/6218 |
| 2018/0268154 A1 * | 9/2018 | Specht ................. G06F 16/176 |
| 2019/0014102 A1 * | 1/2019 | Mathew .................. G06F 21/41 |
| 2019/0042660 A1 * | 2/2019 | Brown ................ G06F 16/9017 |
| 2019/0261169 A1 * | 8/2019 | Kamal ................. H04L 63/0807 |
| 2019/0362087 A1 * | 11/2019 | Ferrans ................. H04L 63/102 |
| 2019/0364051 A1 * | 11/2019 | Ferrans ............... G06F 16/9024 |
| 2019/0372766 A1 * | 12/2019 | Bahrenburg ............. H04L 9/30 |
| 2020/0120098 A1 * | 4/2020 | Berg .................... H04L 63/104 |
| 2020/0184090 A1 * | 6/2020 | Grand ..................... G06F 21/62 |
| 2020/0220858 A1 * | 7/2020 | Ou ......................... H04W 12/06 |
| 2020/0366682 A1 * | 11/2020 | Aggarwal ............. H04L 63/105 |
| 2020/0396222 A1 * | 12/2020 | Gargaro ................. H04L 63/20 |
| 2021/0075870 A1 * | 3/2021 | Kempf ................... G06F 9/5005 |
| 2021/0089357 A1 * | 3/2021 | Garaga .................. G06F 16/23 |
| 2021/0099453 A1 * | 4/2021 | Cohen .................. H04L 63/105 |
| 2021/0117561 A1 * | 4/2021 | Carroll, Jr. ......... G06F 21/6209 |
| 2021/0143991 A1 * | 5/2021 | Toal ...................... H04L 9/0861 |
| 2021/0226956 A1 * | 7/2021 | Wei ...................... H04L 63/108 |
| 2021/0409217 A1 * | 12/2021 | Maley ................... H04L 63/123 |
| 2021/0409409 A1 * | 12/2021 | Palanisamy ............. G06F 21/62 |
| 2022/0237097 A1 * | 7/2022 | Khetarpal ............... G06F 21/33 |
| 2022/0247575 A1 * | 8/2022 | Bansal ..................... G06F 21/64 |
| 2022/0271958 A1 * | 8/2022 | Bassili ................. G06Q 20/367 |
| 2022/0277295 A1 * | 9/2022 | Robinson-Morgan ...... G06Q 20/40145 |
| 2022/0303313 A1 * | 9/2022 | Gargaro ............... H04L 63/1425 |
| 2022/0309356 A1 * | 9/2022 | Singh ....................... G06N 5/02 |
| 2022/0391494 A1 * | 12/2022 | Yang .................... G06F 21/6209 |
| 2022/0391523 A1 * | 12/2022 | Kwong ............... G06F 21/6218 |
| 2023/0095050 A1 * | 3/2023 | Mclean ................. G06Q 10/06 705/301 |
| 2023/0101303 A1 * | 3/2023 | Tammana ........... H04L 63/0815 726/8 |
| 2023/0259651 A1 * | 8/2023 | Chen .................... H04M 3/5183 726/30 |
| 2023/0368233 A1 * | 11/2023 | Doumar ................. G06F 21/34 |
| 2023/0401615 A1 * | 12/2023 | Yamada ............... G06V 10/764 |
| 2023/0421609 A1 * | 12/2023 | Shrivastava .......... H04L 63/104 |
| 2024/0073001 A1 * | 2/2024 | Liu ....................... H04L 9/0825 |
| 2024/0179181 A1 * | 5/2024 | Torlak .................... H04L 63/20 |
| 2024/0283795 A1 * | 8/2024 | McCormick ........ G06F 21/6218 |

\* cited by examiner

DIGITAL DATA PASSPORT AND VISA CREDENTIALING FOR DATA AUTHORIZATION

CROSS-REFERENCE TO RELATED APPLICATIONS

This application is a continuation-in-part of U.S. patent application Ser. No. 18/112,177 filed Feb. 21, 2023, the entire disclosure of which is incorporated by reference.

FIELD

The present disclosure relates to digital data processing and more particularly to data access, use, and sharing mechanisms enabling colocation of data from multiple tenants.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Data management generally refers to the practice of collecting, organizing, protecting, and/or storing data for a particular purpose. The demands of data management not only exist for data owners, but also for service providers or service organizations who manage data for the provision of services. Since service providers tend to manage data on behalf of multiple tenants, the data management architectures used by these service providers often must account for data management preferences at a tenant level. For example, the service provider may isolate data to only authorized users in order to avoid cross-tenant data access. Tenancy can also be leveraged to restrict data sharing and data use.

SUMMARY

A computerized method includes receiving, from a user, a request to perform an operation on data stored in a shared data resource. The shared data resource stores physically integrated data from a plurality of tenants. The method includes determining whether the user is authorized to access the shared data resource storing the data associated with the request based on a role attribute corresponding to the user. The method includes, in response to the user having access to the shared data resource storing the data, identifying user attributes associated with the user; determining, using the user attributes, a set of tenants whose data the user is authorized to access to perform the operation of the request; and generating, for the user, a view of the shared data resource. The view represents data stored in that shared data resource that corresponds to the set of tenants whose data the user is authorized to access to perform the operation of the request.

In other features, the request is a run-time request. In other features, determining the set of tenants whose data the user is authorized to access to perform the operation of the request includes identifying a set of session attributes for the user; determining whether at least one session attribute is subject to a data use restriction associated with one or more tenants of the set of tenants; and in response to at least one session attribute being subject to the data use restriction, filtering data corresponding to the one or more tenants of the set of tenants from the view of the shared data resource. In other features, determining the set of tenants whose data the user is authorized to access to perform the operation of the request includes identifying a set of session attributes for the user; determining whether at least one session attribute is subject to a data sharing restriction associated with one or more tenants of the set of tenants; and in response to at least one session attribute being subject to the data sharing restriction, filtering data corresponding to the one or more tenants of the set of tenants from the view of the shared data resource.

In other features, the shared data resource includes a plurality of rows with data from the plurality of tenants. Each row of the plurality of rows corresponds to a respective tenant of the plurality of tenants and includes a set of fields that uniquely indicates the respective tenant. Generating the view includes incorporating only ones of the plurality of rows that correspond to the set of tenants whose data the user is authorized to access. In other features, for each row of the plurality of rows, the set of fields that uniquely indicate the respective tenant includes a tenant identifier field that uniquely identifies the respective tenant. In other features, determining the set of tenants includes identifying a set of tenant identifiers associated with the user. The view is generated such that, for each row of the view, the respective tenant identifier matches one of the set of tenant identifiers.

In other features, the shared data resource is a relational database. In other features, the request is a structured query language (SQL) statement. The method includes determining, using the user attributes, the set of tenants whose data the user is authorized to access to perform the operation of the request includes dynamically modifying the SQL statement of the request to include a where condition that filters the SQL statement based on the user attributes of the user. In other features, the shared data resource is an object store. The method includes maintaining a mapping from each object of the object store to one of the plurality of tenants.

In other features, the user attributes include a first set of tenants whose data the user is authorized to access. In other features, the user attributes include a second set of tenants whose data the user is excluded from using. In other features, the user attributes include a first set of tenant groups. The user is authorized to access data corresponding to each tenant of each of the first set of tenant groups. In other features, the user attributes include a second set of tenant groups. The user is excluded from using data corresponding to each tenant of each of the second set of tenant groups. In other features, determining whether the user is authorized to access the shared data resource is also based on the user attributes.

In other features, each tenant is associated with a triplet of information including an entity, a role for the entity, and a service organization that provides managed services using the shared data resource. In other features, the user attributes are accessed from a passport specific to the user. Updates to authorization of the user for data access are reflected in changes to the passport. In other features, changes to the passport do not cause changes to an application used by the user to access the shared data resource. In other features, the passport is centrally managed remotely from the shared data resource.

In other features, the passport is received independently of the request. In other features, determination of the set of tenants based on the user attributes is performed following receipt of the request. In other features, determination of the set of tenants based on the user attributes is transparent to the user in that the view does not provide information to the user indicating whether the user has access to all of the plurality of tenants versus just a proper subset of the plurality of tenants. In other features, determination of the set of tenants based on the user attributes cannot be controlled or bypassed by the user.

A computerized method includes receiving, from a user, a request to perform an operation on data stored in a shared data resource. The shared data resource stores physically integrated data from a plurality of tenants. The shared data resource is an object store. The request specifies a requested object of the object store. The method includes determining whether the user is authorized to access the shared data resource based on a role attribute corresponding to the user. The method includes, in response to the user having access to the shared data resource, identifying user attributes associated with the user; determining, using the user attributes, a set of tenants whose data the user is authorized to access to perform the operation of the request; accessing a mapping of objects of the object store to the plurality of tenants; and selectively providing the requested object in response to the mapping indicating that the requested object maps to a respective tenant of the set of tenants.

In other features, the request specifies a set of objects, including the requested object, of the object store. The method includes selectively providing a subset of the set of objects in response to the request. The subset of objects includes only those objects that correspond to the set of tenants.

In other features, a system includes processing hardware and memory hardware. The memory hardware stores instructions that, when executed by the processing hardware, perform some or all of the above method operations.

A computerized method includes receiving, from a user, a request to perform an operation on data stored in a shared data resource. The shared data resource stores physically integrated data from a plurality of tenants. The computerized method includes obtaining a credential document from the user. The credential document includes a session portion that is specific to a current session of the user and a set of restriction criteria. The computerized method includes determining whether the user is authorized to access the shared data resource storing the data associated with the request based on a role attribute specified by the credential document. The computerized method includes, in response to the user having access to the shared data resource storing the data, determining, using user attributes in the credential document, a set of tenants whose data the user is authorized to access to perform the operation of the request; evaluating, selectively based on the session portion, whether the set of restriction criteria restricts the user from performing the operation; and in response to the evaluating identifying that the user is not restricted from performing the operation, performing the operation on a subset of the shared data resource. The subset is limited to data stored in the shared data resource that corresponds to the set of tenants.

In other features, the current session of the user is associated with a single authentication event of the user. In other features, the current session of the user is associated with a single user session. In other features, the single user session is a browser session of the user. In other features, the session portion includes a location of the user. In other features, the set of restriction criteria includes a same-jurisdiction requirement. The evaluating identifies that the user is restricted from performing the operation in response to the location diverging from a defined location of the shared data resource.

In other features, the set of restriction criteria includes a range of times of day. The evaluating identifies that the user is restricted from performing the operation in response to a current time falling outside the range of times of day. In other features, the set of restriction criteria includes a type of use restriction specifying a set of permitted use types. The evaluating identifies that the user is restricted from performing the operation in response to a type of the operation being disjoint with the set of permitted use types. In other features, the set of restriction criteria includes a user persona identification. The user persona identification is associated with a set of authorized operations. The evaluating identifies that the user is restricted from performing the operation in response to the operation being disjoint with the set of authorized operations.

In other features, the set of restriction criteria identifies a set of permitted user computing devices. The evaluating identifies that the user is restricted from performing the operation in response to a current computing device of the user not being included in the set of permitted user computing devices. In other features, the set of restriction criteria includes a set of permitted parties on whose data the user has consent to perform an operation. The evaluation identifies that the user is restricted from performing the operation in response to the operation encompassing data of a party not included in the set of permitted parties.

In other features, the set of restriction criteria includes a data sharing authorization and a confidential data access authorization. The evaluation identifies that the user is restricted from performing the operation in response to the operation including a data sharing operation and the data sharing authorization being negative. The evaluation identifies that the user is restricted from performing the operation in response to the data including confidential data and the confidential data access authorization being negative. In other features, each criterion in the set of restriction criteria is independent of session-specific values. The evaluating ignores the session portion. In other features, the session portion is populated in the credential document in response to at least one of creation of the current session of the user and successful authentication of the user. In other features, the session portion is cleared in the credential document in response to at least one of closing of the current session of the user and expiration of the authentication of the user.

In other features, the set of restriction criteria includes a privacy indicator. The evaluation identifies that the user is restricted from performing the operation in response to the operation incorporating disaggregated data and the privacy indicator establishing that the user is not entitled to private data. In other features, the set of restriction criteria includes a visibility indicator. The evaluation identifies that the user is restricted from performing the operation in response to the operation revealing disaggregated data to the user and the visibility indicator establishing that the user is not entitled to view data. In other features, the credential document specifies a time of expiration. In other features, the credential document includes an electronic security document configured to prove identity of the user.

A system includes memory hardware configured to store instructions and processor hardware configured to execute the instructions. The instructions include receiving, from a user, a request to perform an operation on data stored in a shared data resource. The shared data resource stores physically integrated data from a plurality of tenants. The instructions include obtaining a credential document from the user. The credential document includes a session portion that is specific to a current session of the user and a set of restriction criteria. The instructions include determining whether the user is authorized to access the shared data resource storing the data associated with the request based on a role attribute specified by the credential document. The instructions include, in response to the user having access to the shared data resource storing the data, determining, using user attributes in the credential document, a set of tenants whose data the user is authorized to access to perform the operation of the request; evaluating, selectively based on the session portion, whether the set of restriction criteria restricts the user from performing the operation; and in response to the evaluating identifying that the user is not restricted from performing the operation, performing the operation on a subset of the shared data resource. The subset is limited to data stored in the shared data resource that corresponds to the set of tenants.

In other features, a non-transitory computer-readable medium stores processor-executable instructions. The instructions embody some or all of the above method operations.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Introduction

Figure 1:
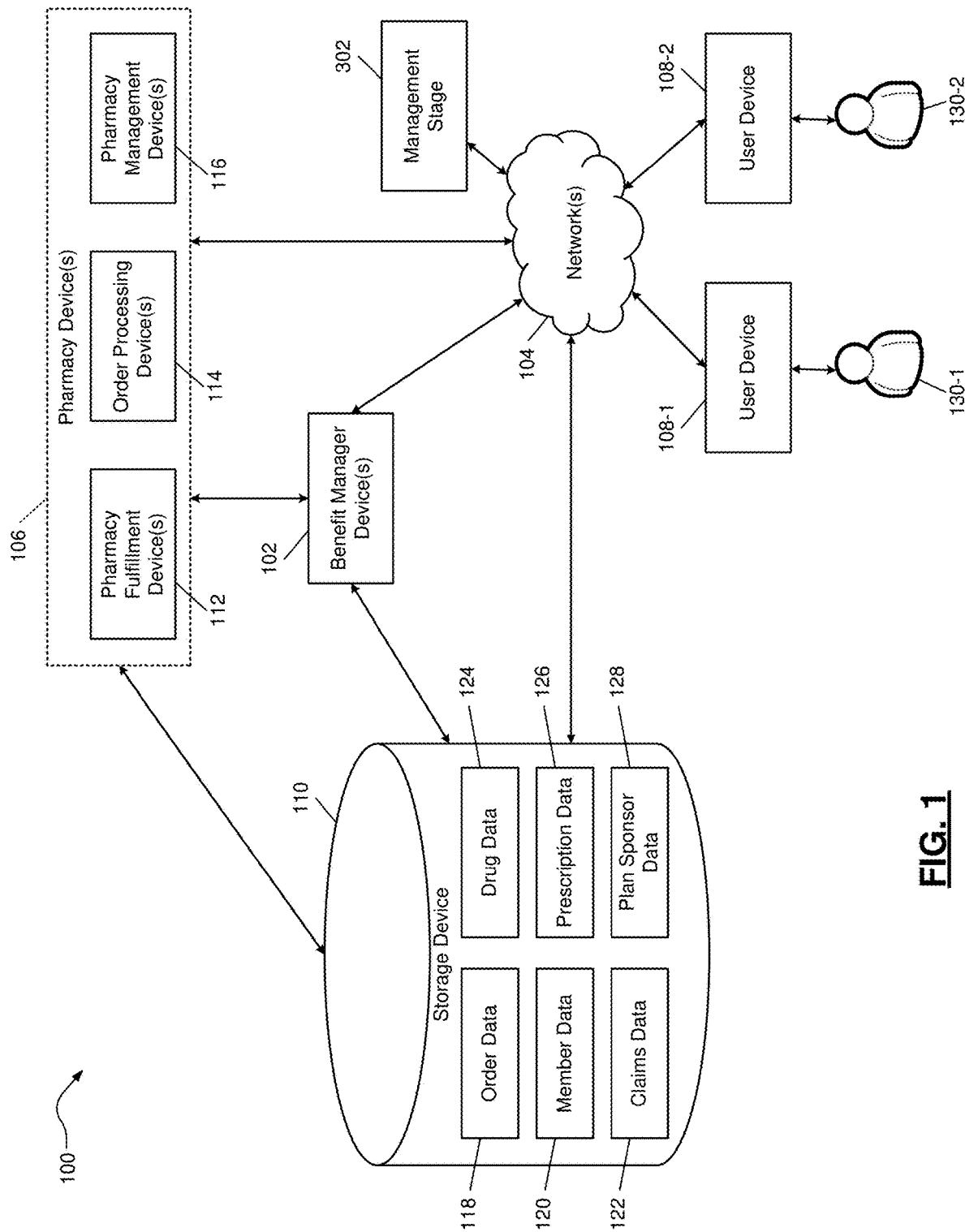
FIG. 1 is a functional block diagram of an example system including a high-volume pharmacy.

Data compliance failures can expose service providers not only to liability, but also potentially compromise client trust and client relationships. Due to these concerns, data architectures have continued to evolve to address some of these issues. One approach to the design and implementation of service provider architectures is to focus on aspects of tenancy. Generally, tenancy is a broad concept that defines a client based on its needs for isolation or security. With the client in mind, tenancy can be approached from several different perspectives. For example, infrastructure tenancy seeks to address a client's needs for security and/or isolation through the lens of computing infrastructure management. For example, infrastructure tenancy may generate computing instances to address security and/or isolation for clients. On the other hand, application tenancy seeks to address clients' needs for security and/or isolation through application management. In this regard, an application may be programmed at an application layer to resolve/address security and/or isolation for clients. In contrast to those tenancy methods, data tenancy seeks to address tenancy aspects through data management. In this respect, a data architecture that focusses on data tenancy may provide a means for achieving data compliance across a diverse set of clients.

Data tenancy refers to the ability to isolate data and to allow data access, sharing, and/or use only to authorized users. A data tenant (also referred to as a "tenant") generally refers to an entity, such as a person, organization, or process, that stores data in a data storage resource (e.g., a database). Each data tenant may have their own data requirements involving data isolation and/or data access (e.g., selective user access). In some examples, a data tenant can additionally be defined by other characteristics or attributes, such as an associated role or an associated product/service. It may be common for an organization to refer to the tenant as a customer or client of the organization's service(s). In that respect, an organization may characterize a customer of many products as a single tenant for all products or define that customer as a separate tenant for each product.

Data multi-tenancy occurs when data from multiple tenants is co-mingled in a shared data resource (e.g., a relational database or an object store). In data multi-tenancy, the data architecture is designed such that the data of each tenant is physically integrated with the other tenants while being logically isolated from the other tenants. With logical isolation, a tenant's data may only be accessible by the tenant and specific users authorized by the tenant (i.e., authorized users).

There may be varying degrees of multi-tenancy. For example, from the perspective of a relational database, the architecture may involve a database, one or more schemas associated with that database, and one or more data tables. The varying degrees of tenancy also apply to data platforms other than relational databases—for example, column stores and object stores. For a first degree of multi-tenancy in the relational database example, all tenants may use the same database, but each tenant has their own schema and likewise their own set of tables that are separate from the schema and tables of other tenants. This may be considered a single degree of multi-tenancy because one of the three elements, the database, is shared among the multiple tenants.

As a second degree of multi-tenancy, all tenants may use the same database and the same schema (i.e., a single schema for the shared database), but each tenant has their own set of tables. Here, this is considered a second degree of multi-tenancy because two of the three elements, namely the database and the schema, are shared among the multiple tenants. Finally, in this scenario, there is a third degree of multi-tenancy where there is a single database with a single schema and all the tenants share the same set of tables. This is considered a third degree because all three elements are shared, namely, the database, the schema, and the table. Although the data architecture described herein could also support a first degree or second-degree version of multi-tenancy, the data architecture discussed further below has been designed to handle the third degree of multi-tenancy where data from multi-tenants is co-mingled (i.e., physically integrated) in a shared data resource (e.g., a relational database or object store).

To implement data multi-tenancy in the third degree, the data architecture may be designed with administrative structures. Administrative structures are such that they have no impact or ties to an application that may use the data of the multi-tenants stored in the data storage resource. In that regard, changes to an application will not affect the data architecture. Furthermore, these administrative structures may be separate and distinct from business structures, such as client or customer attributes that have business meaning to the service provider. In some examples, to generate an administrative structure that is business and application agnostic, the data architecture assigns each tenant an administrative attribute referred to as a tenant identifier. For instance, the tenant identifier is a unique identifier at a row level that is associated with each row or record of data corresponding to a particular tenant. In that sense, a co-mingled table may include multiple records or entries where each row may correspond to a different tenant and each row includes a tenant identifier to indicate which tenant is associated (i.e., owns or manages) with the row of data. In addition to the administrative structures, the data architecture may also include a user attribute structure. Further, the tenant identifier for an organization may be stored within a business table.

This data architecture approach also aims to account for how a service provider, such as a service organization, may operate. That is, often a service provider may have managed services that provide some aspect of the service provider's services to its clients. Managed services refer to the notion that the services from a provider may be managed by service personnel. The service personnel may be employees of the service organization or personnel of a third party. With the dynamics of service personnel, a "user" of tenant data may be the actual tenant or service personnel that has been authorized by the tenant. In this sense, to account for managed services, the data architecture permits users, such as service personnel, to have data access and data use rights for a set of tenants (e.g., multiple tenants).

The data architecture can implement an access control mechanism that uses a combination of role-based access control (RBAC) and attribute-based access control (ABAC). Here, the role-based access control provides coarse-grained access to data resources and information based on user roles. For instance, the data architecture is configured such that a role may be tied to a set of object privileges, but that role is able to perform those privileges for any tenant. Stated differently, a role may have general access rights to all tenant data to perform the set of object privileges. Yet unfortunately, as a coarse-grained access control, role-based access controls cannot on their own address tenant-specific access. Instead, tenant-specific access rights demand fine-grained access controls, such as attribute-based access controls. By employing a combination of RBAC and ABAC, the data architecture can provide controls that dictate data access and data use at the tenant level; allowing the data architecture to have the ability to achieve data compliance for each tenant.

The data architecture described herein is able to address contractual and regulatory compliance on a tenant-by-tenant basis. The data architecture also offers a centrally managed and locally enforced architecture for data assets, such as enterprise data assets. By controlling data access, data sharing, and data use for tenants administratively, this data architecture avoids impacting application functionality and having to secure data at layers other than the data layer. Moreover, users of the data architecture are unaware of tenancy beyond the specific tenants for which they are bound.

High-Volume Pharmacy

FIG. 1 is a block diagram of an example implementation of a service organization that may deploy the data architecture for its tenancy ecosystem. Here, the tenancy ecosystem or system 100 is generally described as being deployed for a high-volume pharmacy or a fulfillment center (for example, a mail order pharmacy, a direct delivery pharmacy, etc.), but the system 100 and/or components of the system 100 may otherwise be deployed (for example, in a lower-volume pharmacy, etc.). A high-volume pharmacy may be a pharmacy that is capable of filling at least some prescriptions mechanically. The system 100 may include a benefit manager device 102 and a pharmacy device 106 in communication with each other directly and/or over a network 104.

The system 100 may also include user devices 108-1 and 108-2 (collectively, user device 108). Users, such as users 130-1 and 130-2 (collectively, users 130), such as a pharmacist, patient, data analyst, health plan administrator, etc., may access the benefit manager device 102 or the pharmacy device 106 using the user devices 108. Each of the user devices 108 may be a desktop computer, a laptop computer, a tablet, a smartphone, etc.

The benefit manager device 102 is a device operated by an entity that is at least partially responsible for creation and/or management of the pharmacy or drug benefit. While the entity operating the benefit manager device 102 is typically a pharmacy benefit manager (PBM), other entities may operate the benefit manager device 102 on behalf of themselves or other entities (such as PBMs). For example, the benefit manager device 102 may be operated by a health plan, a retail pharmacy chain, a drug wholesaler, a data analytics or other type of software-related company, etc. In some implementations, a PBM that provides the pharmacy benefit may provide one or more additional benefits including a medical or health benefit, a dental benefit, a vision benefit, a wellness benefit, a radiology benefit, a pet care benefit, an insurance benefit, a long term care benefit, a nursing home benefit, etc. The PBM may, in addition to its PBM operations, operate one or more pharmacies. The pharmacies may be retail pharmacies, mail order pharmacies, etc.

Examples of the network 104 include a Global System for Mobile Communications (GSM) network, a code division multiple access (CDMA) network, 3rd Generation Partnership Project (3GPP), an Internet Protocol (IP) network, a Wireless Application Protocol (WAP) network, or an IEEE 802.11 standards network, as well as various combinations of the above networks. The network 104 may include an optical network. The network 104 may be a local area network or a global communication network, such as the Internet. In some implementations, the network 104 may include a network dedicated to prescription orders: a prescribing network such as the electronic prescribing network operated by Surescripts of Arlington, Virginia.

The pharmacy device 106 may be a device associated with a retail pharmacy location (e.g., an exclusive pharmacy location, a grocery store with a retail pharmacy, or a general sales store with a retail pharmacy) or other type of pharmacy location at which a member attempts to obtain a prescription. The pharmacy may use the pharmacy device 106 to submit the claim to the PBM for adjudication.

Additionally, in some implementations, the pharmacy device 106 may enable information exchange between the pharmacy and the PBM. For example, this may allow the sharing of member information such as drug history that may allow the pharmacy to better service a member (for example, by providing more informed therapy consultation and drug interaction information). In some implementations, the benefit manager device 102 may track prescription drug fulfillment and/or other information for users that are not members, or have not identified themselves as members, at the time (or in conjunction with the time) in which they seek to have a prescription filled at a pharmacy.

The pharmacy device 106 may include a pharmacy fulfillment device 112, an order processing device 114, and a pharmacy management device 116 in communication with each other directly and/or over the network 104. The order processing device 114 may receive information regarding filling prescriptions and may direct an order component to one or more devices of the pharmacy fulfillment device 112 at a pharmacy. The pharmacy fulfillment device 112 may fulfill, dispense, aggregate, and/or pack the order components of the prescription drugs in accordance with one or more prescription orders directed by the order processing device 114.

In general, the order processing device 114 is a device located within or otherwise associated with the pharmacy to enable the pharmacy fulfillment device 112 to fulfill a prescription and dispense prescription drugs. In some implementations, the order processing device 114 may be an external order processing device separate from the pharmacy and in communication with other devices located within the pharmacy.

For example, the external order processing device may communicate with an internal pharmacy order processing device and/or other devices located within the system 100. In some implementations, the external order processing device may have limited functionality (e.g., as operated by a user requesting fulfillment of a prescription drug), while the internal pharmacy order processing device may have greater functionality (e.g., as operated by a pharmacist).

The order processing device 114 may track the prescription order as it is fulfilled by the pharmacy fulfillment device 112. The prescription order may include one or more prescription drugs to be filled by the pharmacy. The order processing device 114 may make pharmacy routing decisions and/or order consolidation decisions for the particular prescription order. The pharmacy routing decisions include what device(s) in the pharmacy are responsible for filling or otherwise handling certain portions of the prescription order. The order consolidation decisions include whether portions of one prescription order or multiple prescription orders should be shipped together for a user or a user family. The order processing device 114 may also track and/or schedule literature or paperwork associated with each prescription order or multiple prescription orders that are being shipped together. In some implementations, the order processing device 114 may operate in combination with the pharmacy management device 116.

The order processing device 114 may include circuitry, a processor, a memory to store data and instructions, and communication functionality. The order processing device 114 is dedicated to performing processes, methods, and/or instructions described in this application. Other types of electronic devices may also be used that are specifically configured to implement the processes, methods, and/or instructions described in further detail below.

A storage device 110 may include: non-transitory storage (for example, memory, hard disk, CD-ROM, etc.) in communication with the benefit manager device 102 and/or the pharmacy device 106 directly and/or over the network 104. Although the system shows a single network 104, multiple networks can be used. The multiple networks may communicate in series and/or parallel with each other to link the devices 102-110.

The storage device 110 may store order data 118, member data 120, claims data 122, drug data 124, prescription data 126, and/or plan sponsor data 128. Further, the system 100 may include additional devices, which may communicate with each other directly or over the network 104.

The order data 118 may be related to a prescription order. The order data may include type of the prescription drug (for example, drug name and strength) and quantity of the prescription drug. The order data 118 may also include data used for completion of the prescription, such as prescription materials. In general, prescription materials include an electronic copy of information regarding the prescription drug for inclusion with or otherwise in conjunction with the fulfilled prescription. The prescription materials may include electronic information regarding drug interaction warnings, recommended usage, possible side effects, expiration date, date of prescribing, etc. The order data 118 may be used by a high-volume fulfillment center to fulfill a pharmacy order.

In some implementations, the order data 118 includes verification information associated with fulfillment of the prescription in the pharmacy. For example, the order data 118 may include videos and/or images taken of (i) the prescription drug prior to dispensing, during dispensing, and/or after dispensing, (ii) the prescription container (for example, a prescription container and sealing lid, prescription packaging, etc.) used to contain the prescription drug prior to dispensing, during dispensing, and/or after dispensing, (iii) the packaging and/or packaging materials used to ship or otherwise deliver the prescription drug prior to dispensing, during dispensing, and/or after dispensing, and/ or (iv) the fulfillment process within the pharmacy. Other types of verification information such as barcode data read from pallets, bins, trays, or carts used to transport prescriptions within the pharmacy may also be stored as order data 118.

The member data 120 includes information regarding the members associated with the PBM. The information stored as member data 120 may include personal information, personal health information, protected health information, etc. Examples of the member data 120 include name, age, date of birth, address (including city, state, and zip code), telephone number, e-mail address, medical history, prescription drug history, etc. In various implementations, the prescription drug history may include a prior authorization claim history—including the total number of prior authorization claims, approved prior authorization claims, and denied prior authorization claims. In various implementations, the prescription drug history may include previously filled claims for the member, including a date of each filled claim, a dosage of each filled claim, the drug type for each filled claim, a prescriber associated with each filled claim, and whether the drug associated with each claim is on a formulary (e.g., a list of covered medication).

In various implementations, the medical history may include whether and/or how well each member adhered to one or more specific therapies. The member data 120 may also include a plan sponsor identifier that identifies the plan sponsor associated with the member and/or a member identifier that identifies the member to the plan sponsor. The member data 120 may include a member identifier that identifies the plan sponsor associated with the user and/or a user identifier that identifies the user to the plan sponsor. In various implementations, the member data 120 may include an eligibility period for each member. For example, the eligibility period may include how long each member is eligible for coverage under the sponsored plan. The member data 120 may also include dispensation preferences such as type of label, type of cap, message preferences, language preferences, etc.

The member data 120 may be accessed by various devices in the pharmacy (for example, the high-volume fulfillment center, etc.) to obtain information used for fulfillment and shipping of prescription orders. In some implementations, an external order processing device operated by or on behalf of a member may have access to at least a portion of the member data 120 for review, verification, or other purposes.

In some implementations, the member data 120 may include information for persons who are users of the pharmacy but are not members in the pharmacy benefit plan being provided by the PBM. For example, these users may obtain drugs directly from the pharmacy, through a private label service offered by the pharmacy, the high-volume fulfillment center, or otherwise. In general, the terms "member" and "user" may be used interchangeably.

The claims data 122 includes information regarding pharmacy claims adjudicated by the PBM under a drug benefit program provided by the PBM for one or more plan sponsors. In general, the claims data 122 includes an identification of the client that sponsors the drug benefit program under which the claim is made, and/or the member that purchased the prescription drug giving rise to the claim, the prescription drug that was filled by the pharmacy (e.g., the national drug code number, etc.), the dispensing date, generic indicator, generic product identifier (GPI) number, medication class, the cost of the prescription drug provided under the drug benefit program, the copayment/coinsurance amount, rebate information, and/or member eligibility, etc. Additional information may be included.

In some implementations, other types of claims beyond prescription drug claims may be stored in the claims data 122. For example, medical claims, dental claims, wellness claims, or other types of health-care-related claims for members may be stored as a portion of the claims data 122.

In some implementations, the claims data 122 includes claims that identify the members with whom the claims are associated. Additionally or alternatively, the claims data 122 may include claims that have been de-identified (that is, associated with a unique identifier but not with a particular, identifiable member). In various implementations, the claims data 122 may include a percentage of prior authorization cases for each prescriber that have been denied, and a percentage of prior authorization cases for each prescriber that have been approved.

The drug data 124 may include drug name (e.g., technical name and/or common name), other names by which the drug is known, active ingredients, an image of the drug (such as in pill form), etc. The drug data 124 may include information associated with a single medication or multiple medications. For example, the drug data 124 may include a numerical identifier for each drug, such as the U.S. Food and Drug Administration's (FDA) National Drug Code (NDC) for each drug.

The prescription data 126 may include information regarding prescriptions that may be issued by prescribers on behalf of users, who may be members of the pharmacy benefit plan—for example, to be filled by a pharmacy. Examples of the prescription data 126 include user names, medication or treatment (such as lab tests), dosing information, etc. The prescriptions may include electronic prescriptions or paper prescriptions that have been scanned. In some implementations, the dosing information reflects a frequency of use (e.g., once a day, twice a day, before each meal, etc.) and a duration of use (e.g., a few days, a week, a few weeks, a month, etc.).

In some implementations, the order data 118 may be linked to associated member data 120, claims data 122, drug data 124, and/or prescription data 126. The plan sponsor data 128 includes information regarding the plan sponsors of the PBM. Examples of the plan sponsor data 128 include company name, company address, contact name, contact telephone number, contact e-mail address, etc.

Data Multi-Tenancy

In various implementations, the storage device 110 may store data for multiple organizations—for example, for multiple health insurers, multiple pharmacy benefit managers, etc. As an example, the user 130-1 belongs to (or is otherwise authorized by) a first organization while the user 130-2 belongs to a second organization. Some of the member data 120 relates to members of the first organization while other of the member data 120 relates to members of the second organization. The colocation of different organizations' data in the same shared data resource (the storage device 110) may be referred to as multi-tenancy.

In a multi-tenant system, access may be limited differently for different devices, users, and locations. For example, when the user 130-1 accesses the member data 120, the storage device 110 may return only those data elements from the member data 120 that belong to the first organization. Meanwhile, when the user 130-2 accesses the member data 120, the storage device 110 may return only those data elements from the member data 120 that belong to the second organization. Further, as yet another example, a pharmacy user (not shown), which might access the storage device 110 using the pharmacy management device 116, may have access to all organizations (tenants)—when the pharmacy user accesses the member data 120, the storage device may return all of the data elements. The mapping between users and tenants may be managed by a management stage 302 (described in more detail below).

Figure 2:
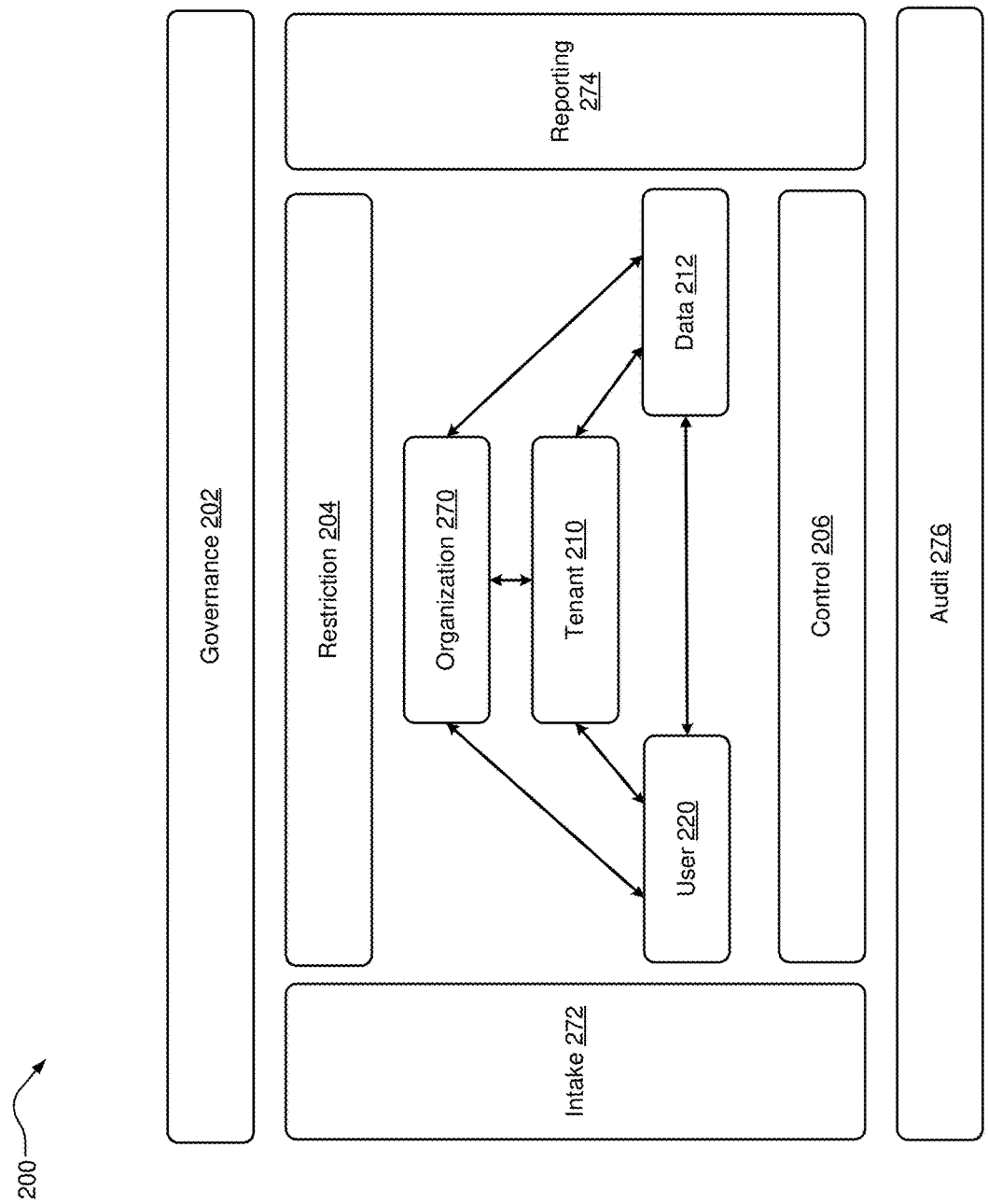
FIG. 2 is a schematic view of an example data tenancy ecosystem.

FIG. 2 is an example of a data tenancy ecosystem 200. The ecosystem 200 allows for coarse- and fine-grained access control so that access to each element of the collocated data is limited to specific users or groups of users, as explained in more detail below. In one example, the ecosystem 200 maybe be used to fully or partially implement the storage device 110 and the management stage 302.

The ecosystem 200 generally includes management and enforcement components that cooperate to isolate data and to enable compliance with various data requirements (e.g., tenant data requirements). In the example depicted in FIG. 2, the high-level components of the ecosystem 200 are governance 202, restriction 204, control 206, tenant 210, tenant data 212, user 220, organization 270, intake 272, reporting 274, and audit 276.

Governance 202 refers to oversight and stewardship of data tenancy across all aspects of the ecosystem 200. The organization 270 may refer to a data custodian, such as a service provider or service organization. Service providers often have the responsibility to steward data tenancy according to data obligations. These data obligations may be contractual obligations (e.g., obligations from a data privacy contract), regulatory obligations (e.g., obligations designated by regulation), privacy rights/obligations, and conditions from other sources. From governance 202 flows other tenancy aspects, such as tenant management, user management, restriction management, and/or control management and enforcement.

Intake 272 is generally responsible for requests and workflows for creation and/or update of users, tenant information, passports, and access controls. Reporting 274 is generally responsible for compliance, contractual, monitoring and alerting, and incident response. Audit 276 is generally responsible for internal and external examinations of the ecosystem 200, and may include certification.

Organization 270 refers to a business entity with relationships to users, tenants, data, and restrictions. Internal entities can be at any level of a corporate structure. External organizations represent third parties. In various implementations, an organization may be an internal/external party providing business operations for a tenant or an internal originating contracting organization of a tenant.

Organization information may include identity, relevant attributes, organization-to-user binding with respect to employment, organization-to-tenant binding with respect to business operations and contracting, organization-to-data binding with respect to origination, and organization-to-restriction binding with respect to constraints. In various implementations, the ecosystem 200 is configured such that organizations have one or more of the following attributes: organizations are defined and established; organization identity is centrally managed; organizations attributes are centrally managed; user, tenant, data, and restriction binding are centrally managed; organization identity, attributes, and binding are provisioned to data assets; and organization management is scalable.

Restriction 204 generally refers to the management of data related to data obligations, such as contractual obligations, regulatory obligations, privacy obligations, and other designated conditions. In some implementations, restrictions fall into three main categories: data access restrictions, data use restrictions, and data sharing restrictions. Data access restrictions generally refer to restrictions that require tenant data isolation and restrict a user's access to only data that they have been authorized to access. In this sense, data access is able to exist at the tenant level. For instance, the tenant 210 defines the set of data that must be isolated from other data.

A binding establishes which users or set of users corresponds to a tenant. In some implementations, a service provider may have a default list of authorized users (e.g., service management personnel) that a tenant 210 can elect to opt-into when registering/on-boarding as a tenant 210 or at some periodic frequency. Some examples of data access restrictions may be tenant level data access restrictions, offshore data access restrictions (e.g., restrictions that permit or prohibit offshore data access), SOC-2 data access restrictions, data fencing restrictions, and selective/designated user access restrictions.

Data use restrictions for the ecosystem 200 generally refer to restrictions that indicate how data is to be used once access has been authorized. In that sense, data use restrictions may compound data access restrictions to ensure data that a user is authorized to access is not used for unwanted purposes. For example, a tenant 210 and a service provider agree to contractual use terms, such as only permitting use of the tenant's data for the provision of services. Some examples of data use restrictions are restrictions that govern data aggregation, offshore service use restrictions, governmental data use restrictions (e.g., Department of Defense prohibitions), direct communication restrictions, restrictions governing purposes other than contracted services, and data monetization restrictions.

Data sharing restrictions seek to ensure that data is governed with security controls to prevent the disclosure of data without consent. One common type of data sharing restriction is a data-privacy-related restriction. That is, besides restrictions which directly address data sharing (that is, the service provider cannot share the tenant's data with third parties or any other tenant), data privacy terms can also dictate how a tenant's data may or may not be shared. For instance, a contract between the tenant and the service provider may dictate that particular tenant data is confidential and that the service provider has an obligation to maintain that confidence. In this situation, data sharing restrictions may be implemented for that tenant data that are designed to prevent breach of the confidentiality.

Since a restriction may stem from data obligations, the ecosystem 200 may implement restrictions by deriving rules regarding data access, data use, and/or data sharing from relationships between a tenant and a service provider. For instance, the rules are derived from contractual terms of a service agreement between the tenant 210 and the service provider. Additionally or alternatively, the rules may be derived from regulatory obligations related to the service being provided to the tenant or the type of tenant. For example, identifying a tenant as a health-related tenant or a governmental entity may trigger a set of rules from regulatory obligations for healthcare or governmental data compliance. In various implementations, restrictions in the ecosystem 200 have one or more of the following properties: contractual, regulatory and other requirements are known; data access requirements are established; restrictions are centrally managed; and restriction management is scalable.

Control 206 is a high-level reference to management and enforcement of safeguards that ensure compliance with data restrictions 204. In some implementations, controls 206 may be categorized by type. For instance, the ecosystem 200 may be designed with security controls, financial controls, and/or privacy controls. As will be described in further detail below, the ecosystem 200 implements controls, such as RBAC and ABAC, to ensure compliance with data restrictions 204 regarding data access, data use, and/or data sharing at the tenant level. In various implementations, data access policy controls are codified and therefore enforced with technical safeguards.

In various implementations, control 206 in the ecosystem 200 may have one or more of the following properties: RBAC is used for coarse grained access to data assets and data objects; ABAC is used for fine grained access to selective data rows/records/objects/documents/etc.; controls are transparent to users, developers, and applications; controls are enforced at the data layer; controls cannot be bypassed; controls are administrative; controls are aligned with the enterprise; controls do not require business subject matter experts (SMEs); controls do not impact application functionality; controls restrict users at an Organization level; controls restrict users at a Tenant level; controls restrict users at a Tenant product level; controls restrict users at a Subsidiary level; controls restrict users by location; controls do not require traversing the business schema to resolve; control policies/logic is standard across all data assets and data objects; controls include metering and billing; training is conducted for any controls that cannot be enforced via code;

Tenant usage is tracked; Data events are logged; controls are scalable; relevant data is archived per retention policy.

Figure 3:
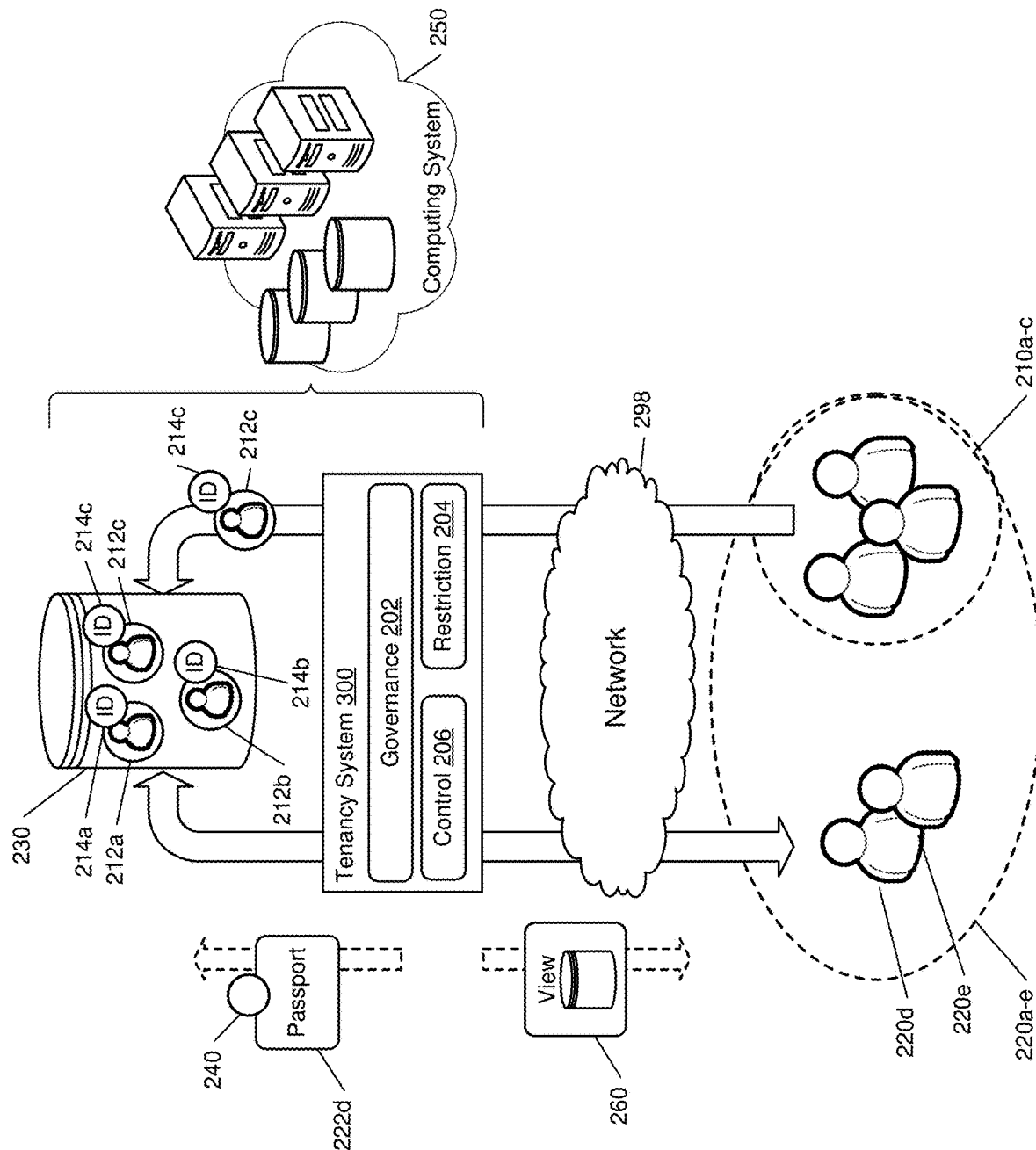
FIG. 3 is a schematic view of an example environment that may deploy the data tenancy ecosystem of FIG. 2.

Tenant 210 (also referred to as a data tenant) generally refers to an entity, such as a person, organization, or process, that stores tenant data 212 in a data storage resource (e.g., shown in FIG. 3 as shared data resource 230). In some examples, the tenant 210 may be defined by tenant information. Tenant information may include attributes that characterize the tenant 210. These tenant attributes may be tailored to the functionality of the ecosystem 200 (e.g., generate by the ecosystem 200 for tenant data management) and/or attributes agnostic to the ecosystem 200 (e.g., a name for the tenant 210). In some examples, during a registration or onboarding process, the ecosystem 200 generates tenant information. For instance, the ecosystem 200 generates and assigns a tenant identifier (ID) to the tenant 210.

In some configurations, the ecosystem 200 generates a tenant profile with information about the tenant 210. The tenant profile may include some or all of the following elements: tenant's location, tenant ID, and tenant's contact information. Tenant information may include the profile and may also include some or all of the following elements: tenant-to-tenant data mapping, tenant-to-tenant data tagging, information regarding tenant data storage locations, tenant restrictions, tenant-to-restriction bindings (also referred to as mappings) with respect to constraints, tenant-to-data bindings with respect to tagging, tenant-to-organization bindings with respect to business operations, and tenant-to-user bindings with respect to authorization.

In some configurations, the tenant 210 is defined by a combination of attributes. This combination of attributes may characterize the underlying entity that owns/manages the tenant data 212 as well as attributes for how that entity interacts with the service provider or service organization offering the shared data resource to the tenant 210.

In one example, the tenant 210 is defined as a combination of an entity attribute, a role attribute, and an attribute that defines the service provider (e.g., the service organization). To illustrate with sample names, the service organization could be Evernorth® Health Services, the entity could be Universal Health Services, Inc. (UHS), and the role of the entity is a buyer of services/products from the service organization (that is, Evernorth® Health Services). This tenant would be defined as a combination of these attributes, such as in the following representation: <Universal Health Services, Inc., Buyer, Evernorth® Health Services>. Here, by using this triplet of attributes, the ecosystem 200 can implement governance 202, restrictions 204, and/or controls 206 that tie to one or more of these attributes or some combination thereof.

In various implementations, the tenant 210 is defined by a combination of entity, role, service organization, subsidiary, and, in some cases, a fifth attribute: product. In these implementations, the terms may mean the following:
  entity: organization or process
  role: a buyer group, a buyer, or a consumer
  buyer group role: represents a well-defined collection of buyers, where buyer groups are internal and external organizations
  buyer role: purchaser of products and services from the organization 270 (or a parent entity to the organization 270), where buyers are individual organizations (payers and employers)
  consumer role: a patron of products and services of the organization 270 with data restrictions, where consumers are at any level of an organization hierarchy
  service organization: an internal/external party providing business operations
  subsidiary: an original internal contracting organization
  product: a product or service offered to the market by the organization 270

In various implementations, the tenants for the ecosystem 200 may have one or more of the following properties: enterprise tenancy standards are not required for non-enterprise data assets; tenancy supports required data isolation levels; tenants are uniquely identified in enterprise data assets; tenant identifier is an administrative attribute; tenants include Buyer Groups, Buyers, and Consumers; tenants are associated with a service organization; tenants are associated with a subsidiary; tenants are optionally associated with at a product level; tenant Groups are leveraged to reduce administration; tenancy can be assigned at any level of a business hierarchy; tenancy is a flat structure—no hierarchical inheritance; tenant structure supports data restrictions; tenant identity, attributes, binding, lifecycle and data asset associations are centrally managed; tenant registry is established; tenant identity, attributes and binding are provisioned to relevant data assets; tenant provisioning is standard across the enterprise; tenants are profiled; tenancy is flexible, extendable, manageable and scalable; and tenancy is distinct from business operations.

Data 212 includes tenant data that is created, owned, organized, managed, or generally associated with a specific tenant. In various implementations, data 212 may be a superset of the tenant data, including data that is distinct from the tenant data. Each tenant 210 may have their own data requirements involving data isolation and/or data access (e.g., selective user access). Referring to the ecosystem 200 of FIG. 2, the data requirements for the tenant 210 may be various restrictions 204 that govern (e.g., by the governance 202) and control (e.g., by the control 206) a user's data behavior for operations involving data 212 from the shared data resource 230.

In various implementations, data 212 of the ecosystem 200 has one or more of the following properties: business data is modeled and understood; a central data asset registry/catalog is established; business data is tenant aware (that is, all business data is labeled with an administrative attribute such as tenant ID); tenant metadata tagging logic is consistent across the enterprise; data-tenant binding/tagging at a row/record/object/document level is established; data isolation levels support data restrictions; business data is provisioned to local data assets; and data management is scalable.

In some implementations, such as FIG. 2, the user 220 refers to an entity that interacts with a shared data repository. In that sense, the user may be persons, proxies, services, systems, processes, and/or bots. This means, for example, that the user may be a tenant 210 or another entity (e.g., service personnel associated with managed services of a service provider). That is, as previously discussed, when the service provider offers a service involving managed services, the managed service offering may also include service personnel users that support the service and/or products on behalf of a tenant. In this situation, the service personnel may be the user even though these personnel are not necessarily tenants themselves. Similar to the tenant, a user may be defined by user information including, but not limited to, a user identifier (ID), relevant user attributes, user-to-tenant binding information, user-to-restriction mapping information, and/or user-to-data access information.

In various implementations, users of the ecosystem may have one or more of the following properties: users are uniquely identified across the enterprise; user data asset identity leverages enterprise identity (for example, LAN ID); user identity is centrally managed; user attributes are centrally managed; user, tenant and restriction binding are centrally managed; user identity, attributes and binding are provisioned to data assets; user management is scalable; and there is a single point of user certification, such as Identity and Access Management (IAM).

Illustration

FIG. 3 depicts an example environment for the ecosystem 200 of FIG. 2. This environment includes three tenants 210a-c communicating via a network 298 with a tenancy system 300 that is configured to implement the governance 202, restrictions 204, and control 206 for the tenant data 212 stored in a shared data resource 230. Although this example illustrates a central system (e.g., the tenancy system 300) implementing these components 202, 204, 206 for the tenant data 212 stored in a shared data resource 230, it is also contemplated that the tenancy system 300 may exist in other configurations that implement these components 202, 204, 206 in various decentralized arrangements where the components 202, 204, 206 are in remote communication.

Referring further to FIG. 3, there are three tenants 210a-c whose corresponding tenant data 212a-c is co-mingled in the shared data resource 230. As shown, each tenant 210 has a tenant ID 214 that may be associated with tenant data 212 stored in the shared data resource 230. That is, the shared data resource 230 stores tenant data 212a-c and the corresponding tenant ID 214a-c for each tenant 210a-c. In this example, the third tenant 210c is shown using the tenancy system 300 to communicate its tenant data 212c with a corresponding tenant ID 214c to the shared data resource 230. For illustrative purposes, the shared data resource 230 is depicted as a relational database, but as previously discussed, the tenancy system 300 is capable of managing data tenancy for other shared data resources, such as object stores and the like. In that regard, the shared data resource 230 may be any data structure that permits the physical integration of data for multiple tenants.

The environment also depicts multiple users 220a-e. Here, the users 220 includes each tenant 210 as well as two additional users 220d, 220e. More specifically, the first tenant 210a may also be considered the first user 220a. The second tenant 210b may also be considered the second user 220b. And the third tenant 210c may also be considered the third user 220c. For this reason, the tenants 210a-c are depicted in a dotted circle that is enclosed by the dotted circle corresponding to the users 220 because the tenants 210 are a set of the users 220 (e.g., due to their inherent ability to access their own tenant data 212).

As illustrated on the left side of the shared data resource 230, a user 220 may communicate a request 240 to the tenancy system 300. This request 240 generally refers to a request to perform an operation on data stored in the shared data resource 230 (e.g., a read request or a write request). In addition to the request 240 or as part of the request 240, the requesting user 220 also passes data credentials 222 corresponding to the user 220 (e.g., shown as data credentials 222d corresponding to the fourth user 220d) in the form of a visa or passport.

Based on the request 240, the tenancy system 300 may determine whether the requesting user 220 is authorized to access the shared data resource 230. For instance, the ability of the user 220 to access data stored in the shared data resource 230 is based on a role (e.g., a role attribute) of the user 220. In some implementations, the tenancy system 300 determines the role of the user 220 based on a user identifier (ID) that indicates the role of the user 220 (e.g., the role may be derived from the user ID). Yet in other implementations, the role of the user 220 may be included in the passport or visa, such that upon receive of the passport or visa for the requesting user 220, the tenancy system 300 is able to determine whether the user 220 is authorized to access the shared data resource 230.

In some configurations, to implement controls at the tenant level, the tenancy system 300 uses the data credentials of the requesting user 220. For instance, in response to the user 220 having access to the shared data resource 230 storing the data (e.g., based on the role of the user 220), the tenancy system 300 determines, using the data credentials 222, a set of tenants 210 whose tenant data 212 that the user 220 is authorized to use to perform the operation of the request 240. With the determined set of tenants 210, the tenancy system 300 generates a view 260 (e.g., a virtual view) of the shared data resource 230 where the view 260 represents tenant data 212 from the shared data resource 230 that the requesting user 220 is authorized to use to perform the operation of the request 240.

Referring further to FIG. 3, the tenancy system 300 and shared data resource 230 may be resources of a remote computing system 250. For instance, the remote computing system 250 is a distributed computing system (e.g., a cloud system) with computing resources, such as remote data processing hardware and remote memory hardware. The tenancy system 300 and/or shared data resource 230 may therefore leverage these computing resource to execute and/or to host their corresponding functionality.

Figure 4:
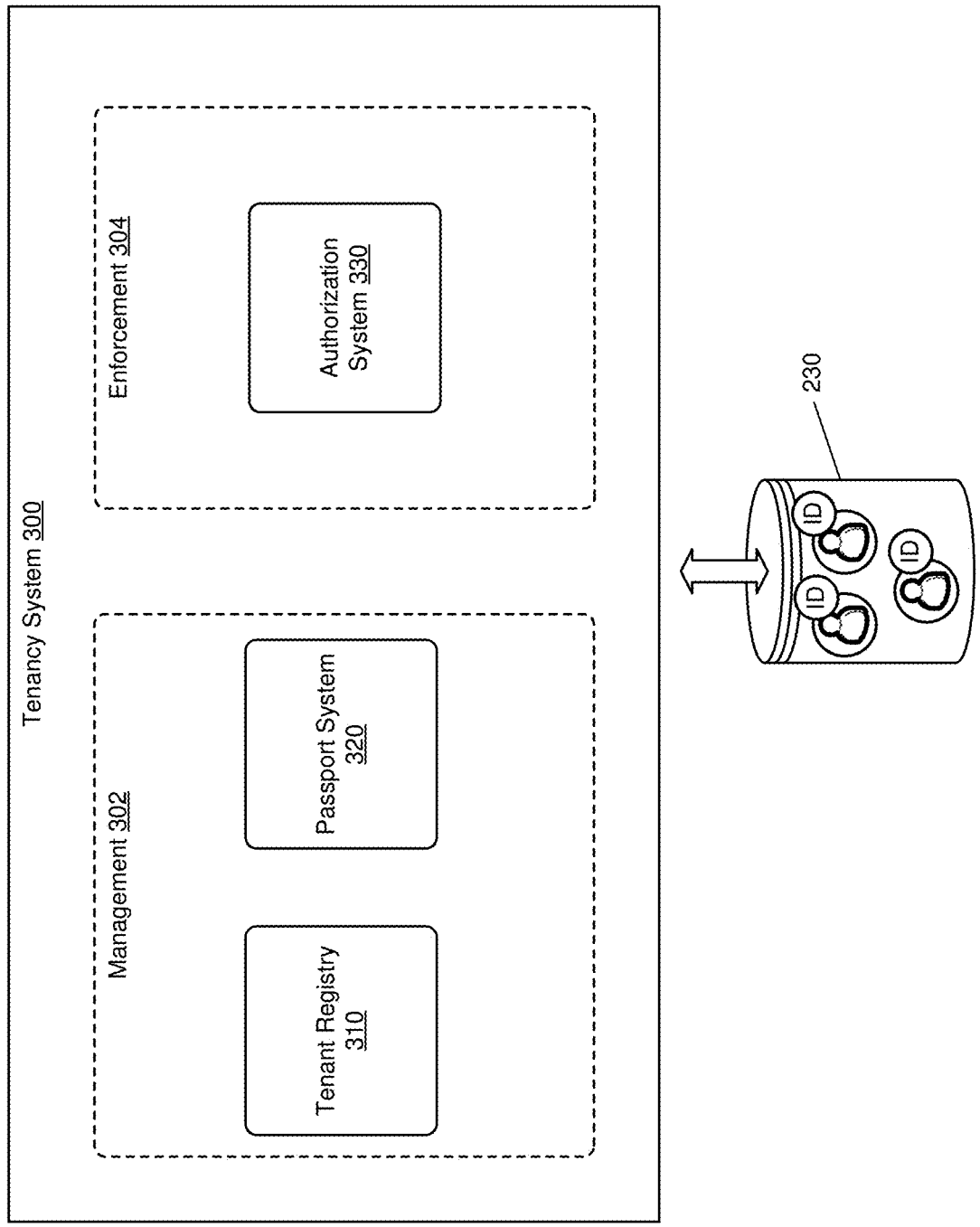
FIGS. 4-6 are schematic views of example functionality of the tenancy system of FIG. 3.
Figure 5:
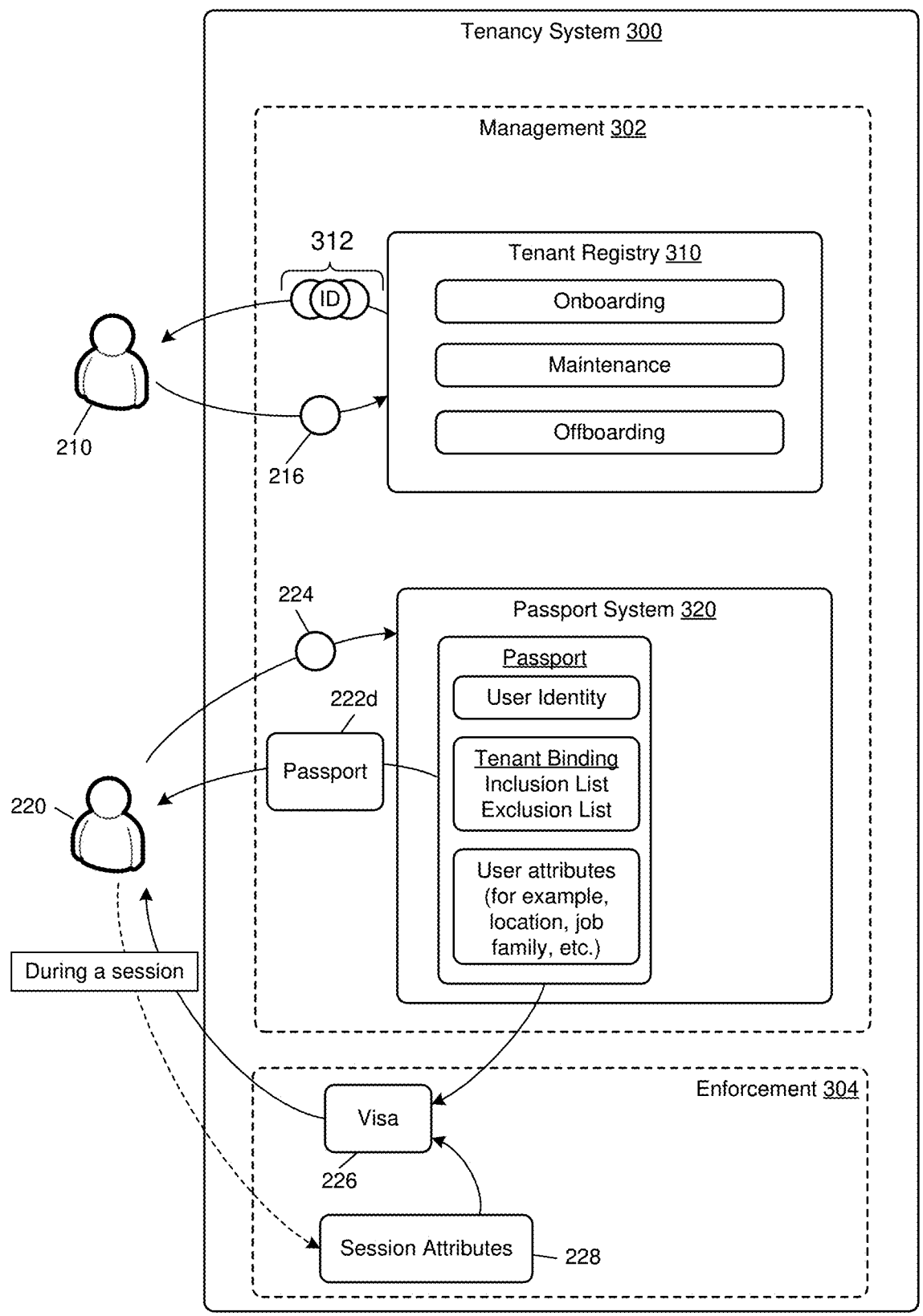
Figure 6:
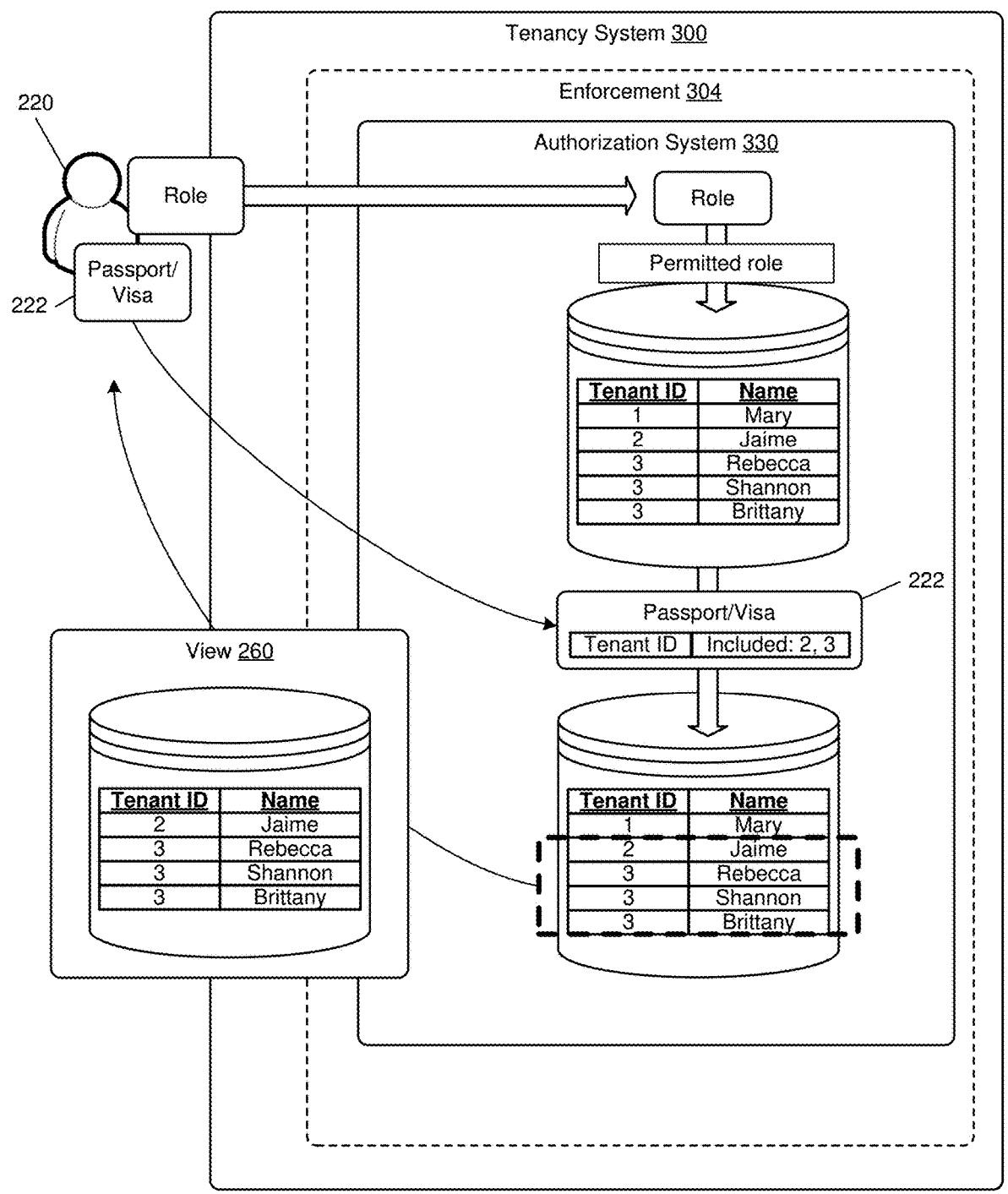

FIGS. 4-6 are examples of the tenancy system 300 and its functionality to implement governance 202, restrictions 204, and controls 206. This functionality may be divided into two stages, a management stage 302 and an enforcement stage 304. The enforcement stage 304 may be integrated into the shared data resource 230 itself. For example, a relational database may integrate the enforcement stage 304 by using views that are limited to specific data. Meanwhile, a data object store may use a policy system and object tagging.

In some implementations, such as FIGS. 4 and 5, the functionality of the management stage 302 is configured to be performed by a tenant registry 310 and a passport system 320. Generally speaking, the management stage 302 may occur for the lifecycle of the tenant 210 and include functionality that performs tenant onboarding, tenant maintenance, and tenant offboarding. During onboarding, the tenant registry 310 may be configured to register, profile, configure, and/or provision data characterizing tenants (i.e., tenant information 312) to local data resources. Management of the passport system 320 includes adding, changing, and removing user data related credentials.

During maintenance, the tenant registry 310 is configured to monitor changes to existing tenants 210. Some examples of the types of changes that the tenant registry 310 may monitor for are changes to tenant information 312, changes to data restrictions for the tenant 210, and/or changes to tenant data mapping. Here, in response to the tenant registry 310 detecting a change, the tenant registry 310 will perform a tenant data synchronization process from the tenant registry 310 to local data resources.

Onboarding may refer to a process where the tenant registry 310 removes existing tenants 210. This removal process may be a logical removal of the existing tenant 210 or a physical removal of the existing tenant 210 (e.g., a removal of the tenant's tenant data 212) depending on compliance factors, such as contractual removal requirements and/or regulatory removal requirements. When the tenant registry 310 performs the removal process, the tenant registry 310 may perform actions such as stopping user actions to the tenant data 212, liberating the tenant data 212 back to the client, and/or purging the ecosystem 200 of the tenant data 212.

The tenant registry 310 may be a centralized management system that generates tenant information 312 for a tenant 210. For instance, as shown in FIG. 5, the tenant registry 310 receives a tenant request 216 and, in response to the tenant request 216, the tenant registry 310 generates tenant information 312. In a broad sense, the tenant information 312 may refer to identifiers, extended attributes, and/or relationships between the tenant 210, tenant data 212, and the shared data resource 230. This tenant information 312 may be passed back to the tenant 210 (e.g., as shown in FIG. 5) or communicated to another portion of the ecosystem 200 (e.g., the shared data resource 230, the passport system 320, or some portion of the enforcement stage 304).

When performing its various operations, the tenant registry 310 may provision the data that it generates (e.g., the tenant information 312) to local resources. These local resources may be used as administrative structures to enable dynamic and/or transparent data access enforcement. In this respect, the tenant registry 310 may be capable of providing synchronization to local data resources for data access enforcement (e.g., in the enforcement stage 304).

One example of tenant information 312 that the tenant registry 310 generates is tenant-to-data asset mapping. For instance, the tenant registry 310 records (i.e., maps) where the tenant data 212 is stored in the shared data resource 230. That is, when the shared data resource 230 receives or ingests the tenant data 212, the tenant data 212 may be stored as one or more row entry records. In this situation, the tenant registry 310 may generate the tenant-to-data asset mapping to indicate storage locations for those records.

Another example of tenant information 312 is the tenant ID. The tenant ID may be a unique identifier assigned to the tenant 210 by the tenant registry 310. As an example, the tenant ID may be an integer with values $1-2^{31}$. Often, this tenant ID is a value that does not carry any of its own intelligence, referred to as a surrogate key. The tenant registry 310 may generate the tenant ID during the onboarding process as an administrative attribute. This administrative attribute represents the tenant 210 and may be used by local data resources to assist in the enforcement of tenant level data access/use.

To illustrate, each row/record/document corresponding to the tenant data 212 contains an administrative attribute, such as the tenant ID, to filter data of the shared data resource 230 during enforcement. For instance, the tenant ID is a unique identifier at a row level that is associated with each row or record of data corresponding to a particular tenant. In that sense, the shared data resource 230, as co-mingled table or data structure, may include multiple records or entries where each row may correspond to a different tenant and each row includes a tenant ID to indicate which tenant is associated (i.e., owns or manages) with the row of data. With this configuration, during enforcement, the tenancy system 300 (e.g., via an authorization system 330) may remove or filter tenant data 212 that corresponds to tenant IDs that a user 220 is not authorized to access/use.

The management stage 302 also includes the passport system 320. The passport system 320 may provision data to local data assets for enforcement similarly to the tenant registry 310. The passport system 320 is configured to generate a formalized representation (e.g., a passport or a visa) of data credentials 222 for a particular user 220.

In some implementations, such as FIG. 5, the passport system 320 receives a credential request 224 from a user 220. In response to the credential request 224, the user 220 may receive one of two credential documents. The first credential document, referred to as a passport, is a general credential document that includes data credentials 222 for the user 220. As a general credential document, the passport is not temporally dependent. That is, the passport does not necessarily factor in or include current session information.

In contrast, the second credential document, referred to as a visa 226, is a credential document for run-time operations. For example, a user 220 communicates their visa 226 to the tenancy system 300 when they seek to access/use tenant data 212 during runtime. In some configurations, such as FIG. 5, the visa 226 may include the credential information (for example, user identity and/or tenant binding) of the data credentials 222d along with attributes for the user 220 that characterize the current session—that is, session attributes 228. Some examples of the session attributes 228 are a location of the user 220 and a current time.

In some configurations, the passport is a credential document because it can contain data credentials 222 that govern data access/use for a user 220 with respect to multiple tenants 210. As shown in FIG. 5, the passport may include a user identity and a concept referred to as tenant binding. The user identity portion of the passport generally includes information that describes or characterizes the user 220 (e.g., attributes of the user 220). Some examples of user attributes that may be included in the user identity portion include a user's name, a user's type (e.g., person, process, machine, bot, etc.), a user category (e.g., internal user or external user), an organization or service provider associated with the user 220, and a data sensitivity threshold for the user 220 (e.g., an indicator of a data clearance level or confidentiality capabilities of the user 220). Additionally, the user identity may include information about the status of the passport, such as a passport version, a passport issue data, a passport validity date or expiration date, etc.

To account for multiple tenants 210 in a single credential document, the passport includes tenant binding. Tenant binding is a readable representation of the tenants 210 that the user 220 is authorized to access or not access. In some implementations, the tenant binding is a list of tenants 210 that the user 220 is authorized to access or not access. In some configurations, the tenant binding may include both an inclusion list enumerating the tenants 210 that the user 220 is authorized to access as well as an exclusion list enumerating the tenants 210 that the user 220 is not authorized to access. For instance, the exclusion list may be more meaningful than an exclusion list when a given user 220 has only a few tenants 210 of many that they are not allowed to access. Likewise, the inclusion list may be more meaningful than the exclusion list when a given user 220 is only allowed to access a few tenants 210 of many.

In some examples, tenants 210 may be arranged in groups. For instance, there may be a first group that is a "restricted" set of tenants 210 and a second group that is a "non-restricted" set of tenants 210. With grouping arrangements, the tenancy system 300 can avoid passports with lengthy tenant binding lists. That is, if the multi-tenancy of the ecosystem 200 includes a large number of tenants 210, the tenant registry 310 may generate or curate tenant groups to simplify tenant binding and the potential resources to read the tenant binding during enforcement. In this approach, the tenant binding may state a tenant group that is authorized or not authorized instead of a specific tenant 210.

FIG. 6 is an example of the functionality of the authorization system 330. In general, the authorization system 330 broadly determines access to specific shared data objects (for short, data objects) through multiple levels of access or authorization. For example, in a system with three conceptual levels, at the first level, the authorization system 330 determines whether the user's identity and role allow access to the data. At a second level, the authorization system 330 determines whether the user has access to a specific data object. At a third level, the authorization system 330 determines which elements (such as rows) of the specific data object that the user has access to.

In one example, during the enforcement stage 304, the authorization system 330 is configured to receive, from a user 220, an authorization request for a shared data resource 230. For example, the authorization request may be a request to perform some operation on the data within the shared data resource 230, such as read or modify. The authorization request may indicate the role of the requesting user 220 and include the user's passport or visa. In response to receiving the authorization request, the authorization system 330 identifies the role of the user 220 and determines whether the role indicates that the user 220 is authorized to access the shared data resource 230. As shown in FIG. 6, the authorization system 330 has determined that the role of the user 220 indicates that the user 220 is authorized to access the shared data resource 230.

In response to the authorization system 330 determining that the user 220 is permitted to have access to the shared data resource 230, the authorization system 330 determines a set of tenants 210 whose data the user 220 is authorized to use. Here, to determine the set of tenants 210, the authorization system 330 identifies the data credentials 222 associated with the passport or visa from the user 220. For instance, the authorization system 330 identifies the tenant binding that is included with the passport or visa. As shown in FIG. 6, the tenant binding indicates that the user 220 is authorized to access tenant data 212 for tenants 210 associated with tenant IDs 2 and 3.

Based on this tenant binding, the authorization system 330 identifies the rows in data object of the tenant data 212 associated with tenant ID 2 and 3 from the shared data resource 230. For instance, the authorization system 330 identifies tenant data 212 from the shared data resource 230 that has a tenant ID that matches (e.g., exact match) tenant IDs from the tenant binding that are authorized tenant IDs (e.g., on an authorized list or inclusion list). As an example, FIG. 6 illustrates that the shared data resource 230 has three tenant IDs that correspond with five tenant names. Of those three tenant IDs, the authorization system 330 isolates the tenant ID 2 and 3 based on the tenant binding and generates a view 260 of the shared data resource 230 that corresponds to an isolated view of data for tenant ID 2 and 3. Here, this view 260 is a virtual view that represents data stored in the shared data resource 230 that corresponds to the set of tenants 210 whose data the user 220 is authorized to use (e.g., tenants corresponding to tenant IDs 2 and 3). In that respect, the view 260 is such that the user 220 cannot see that the shared data resource 230 includes other tenant data 212 beyond what the user 220 is authorized to see/interact with.

In some examples, such as when the shared data resource 230 is a relational database, the authorization request is a statement in structured query language (SQL). When the authorization request is a statement in SQL, the authorization system 330 may determine the set of tenants 210 whose data the user 220 is authorized to use by dynamically and transparently modifying the SQL statement of the request to include a where condition that filters the SQL statement based on the data credentials 222 of the user 220 included in the passport or visa. Here, this statement modification may occur after the authorization system 330 determines that the user 220 is authorized to access the shared data resource 230 based on the role of the user 220.

In some examples, such as when the authorization system 330 evaluates data credentials 222 from a visa, the authorization system 330 may also consider one or more session attributes for the user 220 indicated by the visa. For instance, although the user 220 is an authorized user of for a particular tenant 210, that tenant 210 may have data use restrictions or controls that prevent particular session attributes from accessing the tenant data 212. As an example, the tenant 210 may not want an offshore user 220 to access its tenant data 212. In this example, even though a particular user 220 is generally authorized to use the tenant's data, the fact that the particular user 220 may be currently located offshore based on the session attributes of the user 220 in the visa, should prohibit the user 220 from accessing the tenant's data 212.

To illustrate the scenario of session-based attributes, the authorization system 330 identifies a set of session attributes for the user 220 (e.g., included in the visa documentation) and then determines whether at least one session attribute is subject to a data use restriction (i.e., control) associated with one or more tenants 210. In response to at least one session attribute being subject to the data use restriction, the authorization system 330 filters the data corresponding to the one or more tenants 210 from the view of the shared data resource 230. Applying this to the example illustrated in FIG. 6, if the session attributes of the user 220 indicate that the user 220 satisfies a data use restriction of the tenant 210 with tenant ID 2, the view 260 generated by the authorization system 330 would remove or filter the row of data corresponding to tenant ID 2, "Jaime."

Block Diagrams

Figure 7:
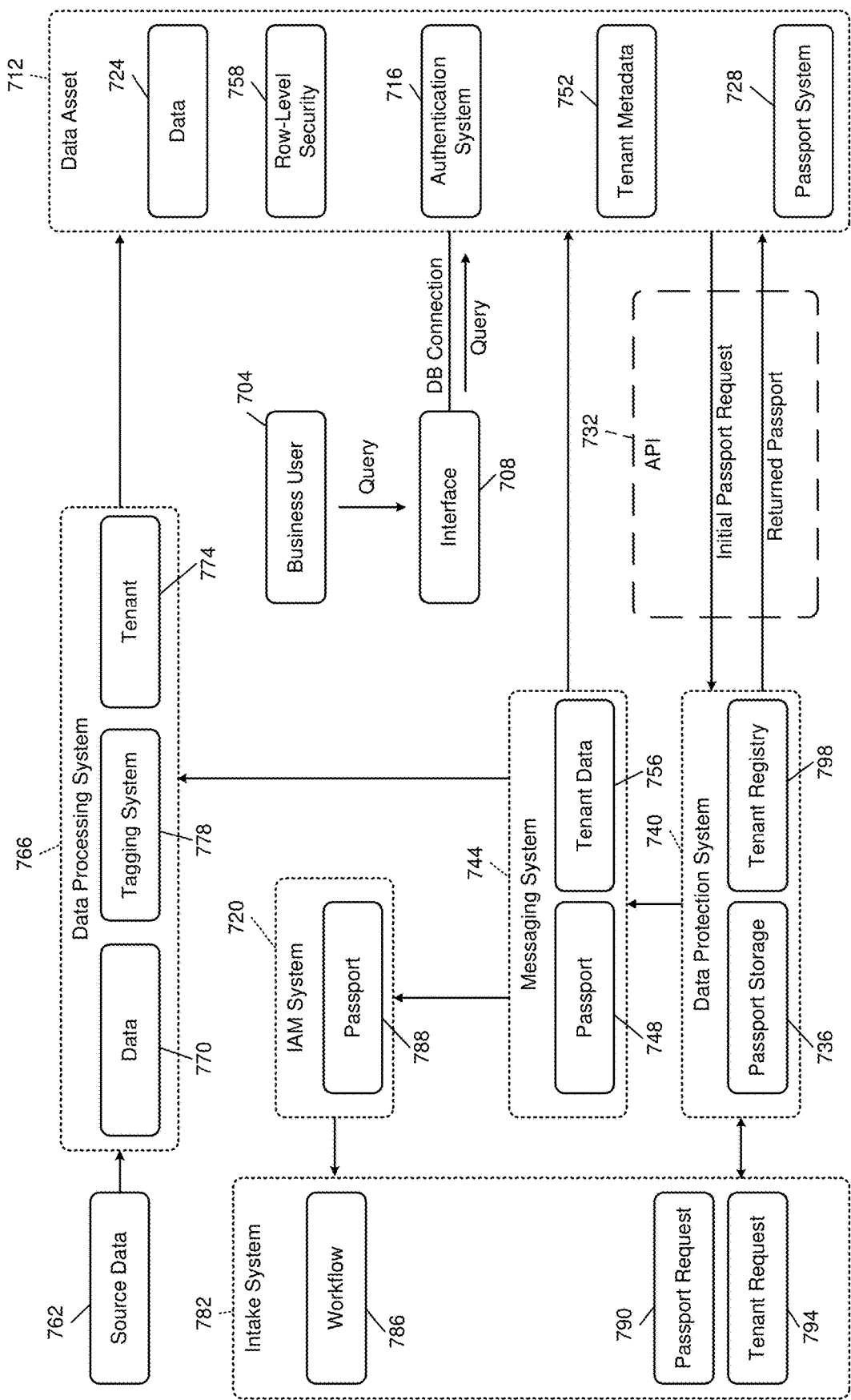
FIG. 7 is a functional block diagram of an example implementation of a data tenancy ecosystem in the context of a database.

FIG. 7 is a functional block diagram of an example implementation of a data tenancy ecosystem in the context of a database.

A business user 704 sends a query to an interface 708. For example, the query may take the form of a SQL query, an application programming interface (API) call, a graphical user interface (GUI) request, etc. The business user 704 is a generic representative of any number of users that may need to access a shared data asset 712 (also referred to as a data asset 712).

The interface 708 establishes a data connection to the data asset 712. The data asset 712 may be a relational database, a column store, etc. The data connection may take the form of an open database connectivity (ODBC) connection. The business user 704 and/or the interface 708 may be an instantiation of the user 220 of FIG. 2, and may therefore be a person, proxy, service, system, process, bot, etc. As one example, the interface 708 may be a proxy for multiple business users that share the same data access rights.

So, the interface 708 may authenticate to the data asset 712 and/or the business user 704 may authenticate to the data asset 712. For example, the business user 704 may present credentials to the data asset 712 via the interface (such as when the interface 708 is a SQL command line) or the interface 708 may present credentials to the data asset 712. When the interface 708 is presenting credentials to the data asset 712, the business user 704 may need to authenticate to the interface 708.

In various implementations, the data asset 712 may include an authentication system 716, which may also define roles for each authenticated user. In various implementations, the authentication system 716 may communicate with an identity and access management (IAM) system, such as IAM system 720, to coordinate credentials.

For the business user 704 to access data in the data asset 712, the business user 704 or the interface 708 authenticates as a specific user to the authentication system 716. In various implementations, the user is associated with a specific role (such as reader or modifier), which establishes a coarse granularity of what the authenticated user is able to do with respect to data 724 within the data asset 712. For example, the reader role may be granted a "select" privilege to allow execution of SELECT statements. In various implementations, the role of a user is the same for all of the data 724. In other implementations, the role of a user may vary across different portions (such as tables) of the data 724—that is, the user may have the role of reader for some tables and modifier for others. This multi-role capability may have performance drawbacks that cause it to be avoided in certain applications. In various implementations, defining roles may be avoided and instead specific access rights are directly assigned to each user.

The user then needs to be associated with one or more tenants in order to access data of those tenants. A passport system 728 stores a passport for each user that defines, among other things, which tenants and tenant groups the user does and does not have access to. Specifically, the passport for a user defines which portions of the data 724 are accessible to the user.

In various implementations, the passport system 728 is initially loaded with a passport for every user created in the authentication system 716. This initial loading may be performed via an application programming interface (API) 732. The passport system 728 sends an initial passport request to the API 732, which retrieves the requested passport from passport storage 736 of a data protection system 740 and returns the passport to the passport system 728.

In various implementations, subsequent changes to a passport may be communicated via a messaging system 744. FIG. 7 depicts a passport 748 being shared by the messaging system 744. In various implementations, the messaging system 744 may be implemented as a publish/subscribe architecture, such as the Apache Kafka messaging system. In such implementations, the data asset 712 may subscribe to updates to users and tenants stored in the data asset 712 or to all.

The data asset 712 stores tenant metadata 752, which may be updated by the messaging system 744. The tenant metadata 752 may define tenant groups and may include other metadata about each tenant, such as name (which may take the form of a string literal), organization, etc. The tenant metadata 752 may be updated via the messaging system 744. FIG. 7 depicts tenant data 756 being shared by the messaging system 744. As one example, a tenant group may include all unrestricted tenants—then, the passport for a user can simply specify this tenant group rather than individually specifying every unrestricted tenant. As a numeric example, the might be 100,000 unrestricted tenants—if an unrestricted tenant group is defined, a user passport could specify that single unrestricted tenant group rather than listing all 100,000 unrestricted tenants. Still further, if the set of unrestricted tenants changes, the composition of the group can be changed without having to change every user's passport.

In various implementations, the data asset 712 includes row-level security 758 that technologically enforces the restriction of user access to the data of only those tenants specified by the respective passport. In such implementations, some or all of the data 724 is organized into rows and some or all of the rows include information specifying the respective tenant. The row-level security 758 may be transparent to the user; example implementations are described in more detail below. In various implementations, the row-level security 758 may be applied at runtime, rather than, for example, creating materialized views for each tenant or user.

For example, a row (also referred to as a record) containing data about a customer may include a field specifying which tenant the customer corresponds to. In various implementations, the data 724 includes multiple tables—some are tenant-specific while some are tenant-agnostic. For example only, a table of medicinal products, including names, dosages, and National Drug Code (NDC) may be a tenant-agnostic table. Another tenant-agnostic table might include ZIP code information. In various implementations, tenant-agnostic tables may omit any field specifying a tenant or, in other implementations, the tenant field may be present but ignored by the row-level security 758 for tenant-agnostic tables. In still other implementations, there may be a defined value for tenant indicating that the rows of a tenant-agnostic table are accessible to all users—for example, there may be a tenant group that is a superset of all tenants.

To populate the data 724, source data 762 may be processed by a data processing system 766. The data processing system 766 may perform any number of extract/transform/load (ETL) actions, such as converting data to specific data types, normalizing numbers to defined scales, etc. The data processing system 766 includes a tagging system 778 that tags data 770 with tenant information 774. For example, the tagging system 778 may add a field to each table (or to each table that is not tenant-agnostic) that specifies the tenant. The field may hold a tenant ID, which may be a numeric data type such as an integer. The tagging system 778 determines the appropriate tenant for each row and sets the tenant value for that row according to the corresponding tenant ID from the tenant information 774. The resulting data is provided to the data asset 712 for addition to the data 724.

An intake system 782 may include a workflow engine 786 for processing updates to users, tenants, and passports. For example, a passport request 790 or a tenant request 794 may be provided to the data protection system 740. Any updates to the passport storage 736 or a tenant registry 798 are provided (that is, published when using a pub/sub system) to the messaging system 744 for distribution to, for example, the data asset 712, the data processing system 766, and the IAM system 720. In various implementations, the IAM system 720 may return a passport 788 to the intake system 782 to evaluate whether any updates are needed. For example only, the intake system 782 may be implemented using workflow management software from ServiceNow. As just another example, the IAM system 720 may be implemented using enterprise identity cloud software from Saviynt.

In various implementations, access may also be controlled based on location. For example, in the tenant metadata 752, a tenant may have an attribute indicating an onshore restriction. For example an onshore restriction may take the form of restricting access to certain data only to users having the same location as the data. In such implementations, certain rows, tables, etc. of the data 724 may be tagged with a location. In other implementations, an onshore restriction for a tenant may restrict access to users having the same location as the tenant regardless of the data's location. In such implementations, the tenant metadata 752 may indicate a location for the tenant.

Figure 8:
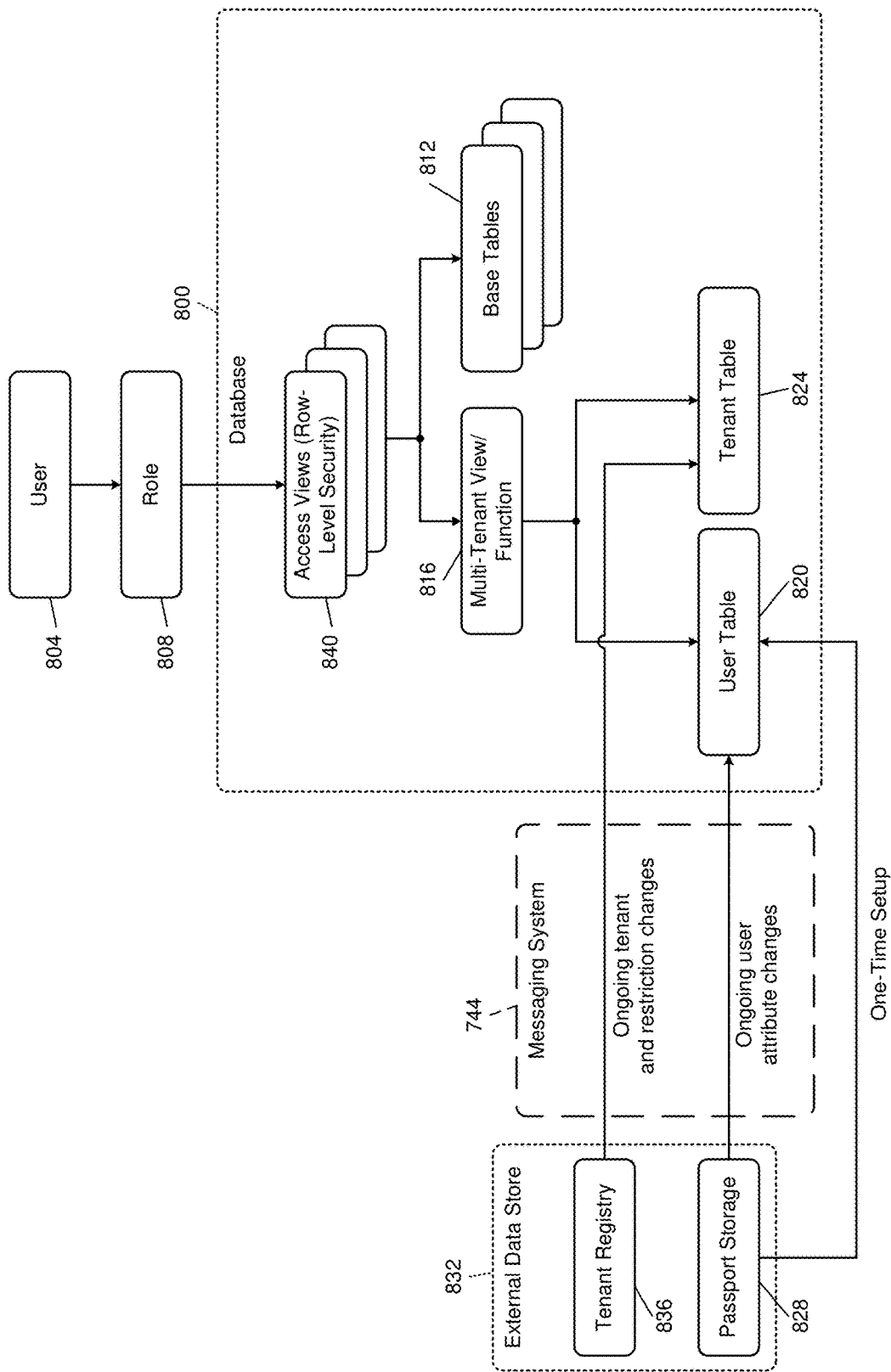
FIG. 8 is a functional block diagram of an example implementation of a data tenancy ecosystem in the context of a particular relational database.

FIG. 8 demonstrates an example implementation of the ecosystem 200 for a relational database 800. For example only, the database 800 may be implemented using relational database software offered by Teradata Corporation. A representative user 804 authenticates to the database 800 according to a particular role 808, such as viewer. The database 800 includes one or more data tables, depicted as base tables 812. Some or all of the base tables 812 are multi-tenant while others may be common across tenants. A multi-tenant view/function 816 may be defined, which relies on user data from a user table 820 and tenant data from a tenant table 824. The user table 820 is updated—in various implementations, via the messaging system 744—based on changes to passports in passport storage 828, which may be located in an external data store 832. The tenant table 824 is updated—in various implementations, via the messaging system 744—based on changes to tenant metadata in tenant registry 836, which may also be located in the external data store 832.

Row-level security in the database 800 may be implemented using one or more access views, depicted as access views 840. In various implementations, the number of the access views 840 is the same as the number of the base tables 812 that are multi-tenant. When the user 804 queries the database 800, the access views 840 are used to deliver data such that row-level security is automatically enforced. The multi-tenant view/function 816 encodes, for a user query, tenants authorized for the user according to the respective passport in the user table 820 as well as, in various implementations, tenant group data in the tenant table 824. The multi-tenant view/function 816 may also encode location checking to require, at least for some tenants (as indicated by data in the tenant table 824) that the location of the user indicated by the passport matches the location of the data and/or the location of the tenant.

An example of the multi-tenant view/function 816 relies on tenant-level data access logic, which serves as a filter for tenant data in comingled data objects. This logic is specific to a data asset user and presents a virtual view of the data object, transparent to the user. This logic may be implemented at the data layer in various ways—such as in a policy, view, function, etc.—depending on the capabilities of the data platform and cannot be bypassed. The logic can be described as a dynamic predicate applied to a query at runtime, which evaluates to true or false for each row/record/object/etc. of data. The logic filters out tenant data that the user is not authorized to access. The logic references administrative structures such as a user's attributes, which contain user-to-tenant binding and may include other attributes that can be used to further filter tenant access.

For example, the following logic may be used to select data based on user attributes including a set of included tenants, a set of included tenant groups, a set of excluded tenants, and a set of excluded tenant groups.

```
select t.tenant_id
    from
        ,tenant          as t
        ,user_attribute  as a
    where t.tenant_id    = TENANT_ID
    and a.lan_id         = DBUSER
```

-continued

```
and (
    a.org_nm          = t.org_nm
    or
    a.org_nm          = 'ALL_ACCESS_ORG'
)
and (
    a.tenant_include_list    = '=ALL='
    or
    a.tenant_include_list    like
        concat('%','=',t.tenant_id,'=','%')
    or
    a.tenant_group_include_list = '=ALL='
    or
    a.tenant_group_include_list like
        concat('%','=',t.tenant_group_id,'=','%')
)
and (
    (a.tenant_exclude_list    = '=NONE='
    or
    a.tenant_exclude_list     not like
        concat('%','=',t.tenant_id,'=','%')
    )
    and (
        a.tenant_group_exclude_list ='=NONE='
        or
        a.tenant_group_exclude_list not like
            concat('%','=',t.tenant_group_id,'=','%')
    )
);
```

In addition, the above logic includes an organizational check—specifically, to verify that the user is either a member of the same organization (a.org_nm) as the tenant (t.org_nm) or is in an organization that can access all organizations ("ALL_ACCESS_ORG"). This organizational check is presented as an example of an additional layer of access control and may be omitted or supplemented in various implementations.

Example

As a simplistic example, the following code for a relational database (PostgreSQL) demonstrates the creation of different users (user1 . . . user4) with role "gdw" and different access rights to an example database (named cvlpsqld20034_db). The database includes a table with five data rows, each associated with a specific tenant ID. In this toy example, the only data in each row is a customer name.

Each user has a passport indicating a set of tenants to which they have access, a set of tenant groups to which they have access, a set of tenants to which access is excluded, and a set of tenant groups to which access is excluded. In each case, the set may be the empty set. In this particular example, three tenants are defined.

```
--creating users (object owner, business users, roles)
create user gdw   with password 'secret';
create user user1 with password 'secret';
create user user2 with password 'secret';
create user user3 with password 'secret';
create user user4 with password 'secret';
create role dbro ;
--granting privileges to the users and roles
grant connect on database cvlpsqld20034_db   to gdw ;
grant connect on database cvlpsqld20034_db   to dbro ;
--creating schema and changing ownership
create schema gdw ;
alter schema gdw owner to gdw ;
--granting usage on schema to users, and roles
grant usage on schema gdw to dbro ;
grant dbro to user1 ;
```

-continued

```
grant dbro to user2 ;
grant dbro to user3 ;
grant dbro to user4 ;
set role gdw ;
--creating customer table
create table gdw.customer
( tenant_id                integer         not null ,
    customer_name          varchar (30)    not null
);
--loading customer table
insert into gdw.customer values (1,'Mary');
insert into gdw.customer values (2,'Jaime');
insert into gdw.customer values (3,'Rebecca');
insert into gdw.customer values (3,'Shannon');
insert into gdw.customer values (3,'Brittany');
-- granting select access to dbro
grant select on gdw.customer to dbro ;
--creating local attribute structure table
set role gdw ;
create table gdw.las_attribute
(
    lan_id                      varchar (100)   primary key ,
    tenant_include_list         varchar (500)   not null    ,
    tenant_group_include_list   varchar (500)   not null    ,
    tenant_exclude_list         varchar (500)   not null    ,
    tenant_group_exclude_list   varchar (500)   not null
);
--loading las_attribute data
insert into gdw.las_attribute values('user1','=1=',
'=NONE=','=NONE=','=NONE=');
insert into gdw.las_attribute values('user2','=2=3=',
'=NONE=','=NONE=','=NONE=');
insert into gdw.las_attribute values('user3','=NONE=',
'=ALL=','=2=','=NONE=');
insert into gdw.las_attribute values('user4','=NONE=',
'=TG1=','=NONE=','=NONE=');
--creating tenant table
create table gdw.las_tenant
(
    tenant_id           integer     primary key ,
    entity_name         varchar     not null    ,
    tenant_group_id     varchar     not null    ,
    tenant_group_name   varchar     not null
);
--loading tenant table
insert into gdw.las_tenant values('1','BCBS of
Tennessee','TG1','NON-RESTRICT');
insert into gdw.las_tenant values('2','Disney','TG1','NON-
RESTRICT');
insert into gdw.las_tenant values('3','ABC
Hardware','TG2','RESTRICT');
grant select on gdw.las_attribute to dbro;
grant select on gdw.las_tenant to dbro;
--enabling row-level security for customer table
alter table customer enable row level security;
--creating policy for customer table
create policy customer_rls_policy
on customer
for select
using (
customer.tenant_id = (
select customer.tenant_id
from
gdw.las_tenant        t ,
gdw.las_attribute     a
where
customer.tenant_id = t.tenant_id
and
session_user=a.lan_id
and
(
a.tenant_include_list ='=ALL=' or a.tenant_include_list like
concat('%','=',t.tenant_id,'=','%')
or
a.tenant_group_include_list = '=ALL=' or
a.tenant_group_include_list like
concat('%','=',t.tenant_group_id,'=','%')
)
and
(
(a.tenant_exclude_list = '=NONE=' or a.tenant_exclude_list not
like concat('%','=',t.tenant_id,'=','%') )
and
(a.tenant_group_exclude_list ='=NONE=' or
a.tenant_group_exclude_list not like
concat('%','=',t.tenant_group_id,'=','%') )
)
)
);
```

In the above snippet of code, a user-specific "select" statement is defined. In other words, the SQL SELECT statement behaves differently depending on which user is executing it. Note that the enforcement is handled automatically and transparently by the user-specific select statement: a user does not have to understand how access control is being performed or even that access control is being performed. Instead, the user simply issues a select statement, and the data to which they have access is returned.

Continuing the above example, when a SELECT * statement is executed by each of the defined users, the data returned is shown below. Each line of data includes the tenant ID and the customer name.

```
Connecting as user1
select * from customer;
    1 | Mary
Connecting as user2
select * from customer;
    2 | Jaime
    3 | Rebecca
    3 | Shannon
    3 | Brittany
Connecting as user3
select * from customer;
    1 | Mary
    3 | Rebecca
    3 | Shannon
    3 | Brittany
Connecting as user4
select * from customer;
    1 | Mary
    2 | Jaime
```

Object Storage

Figure 9:
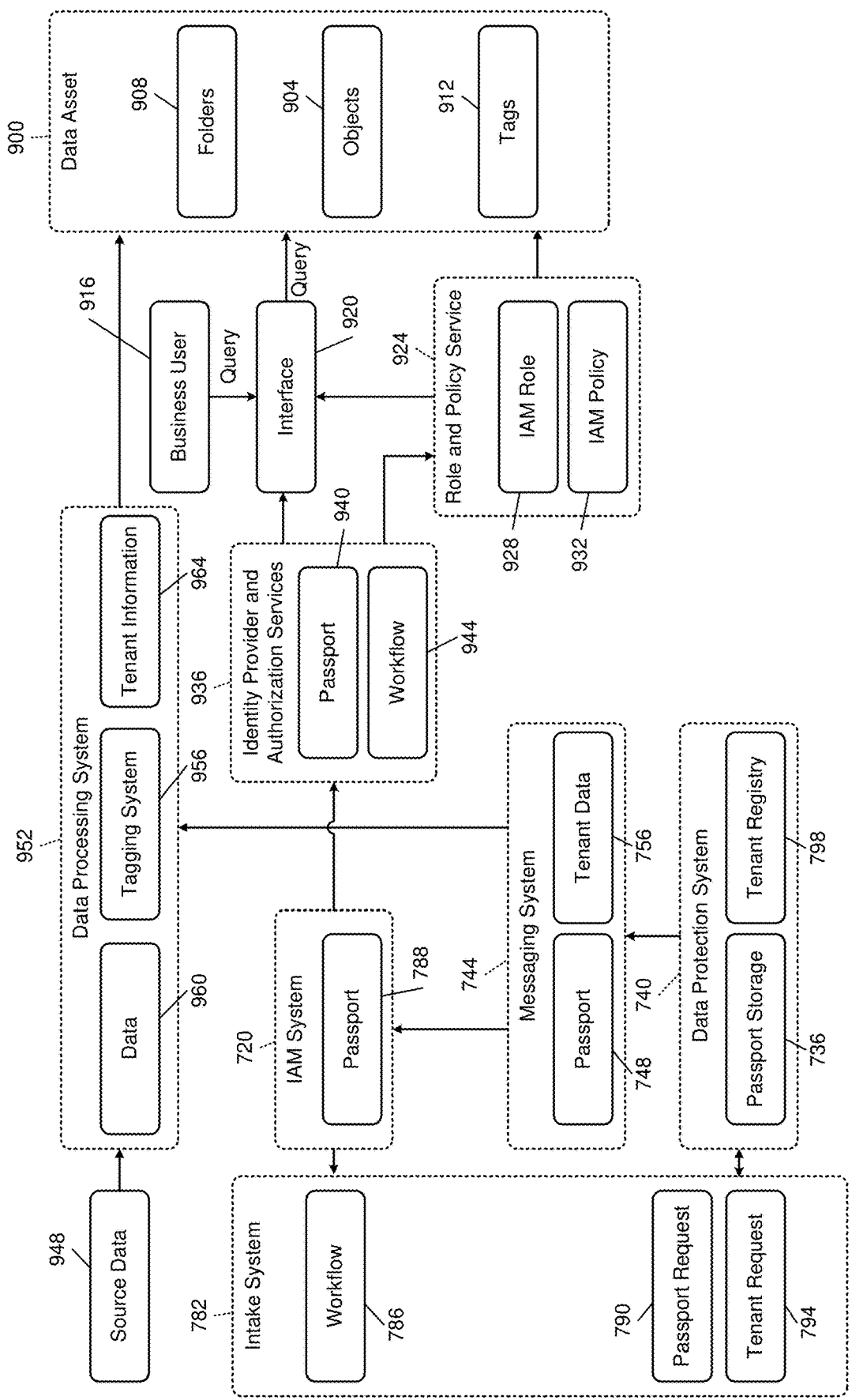
FIG. 9 is a functional block diagram of an example implementation of a data tenancy ecosystem in the context of object storage.

FIG. 9 depicts an example implementation of the ecosystem 200 for an object storage (or block storage) data asset 900, such as one or more buckets in Simple Storage Service (S3) from Amazon Web Services (AWS). For example, the data asset 900 includes objects 904, which may be organized into folders 908. The objects 904 are associated with tags 912. For example, each of the objects 904 is associated with a specific one of the tags 912. In various implementations, there is a one-to-one relationship between the objects 904 and the tags 912. The tags 912 indicate to which tenants the objects 904 belong. FIG. 9 includes elements that may be similar or identical to those of FIG. 7. For simplicity of explanation, elements that may be implemented similarly to those of FIG. 7 are indicated with the same reference numeral.

A business user 916 queries the data asset 900 via an interface 920. The business user 916 and/or the interface 920 authenticate to the data asset 900 using a role and policy service 924. The role and policy service 924 includes an identity and access management (IAM) role 928 and an IAM policy 932. In various implementations, the role and policy service 924 may be implemented by an IAM services from AWS. The role and policy service 924 is updated from an identity provider and authorization service 936, which conveys a passport 940 and implements a workflow 944.

The data asset 900 may be populated from source data 948, which may be processed by a data processing system 952. The data processing system 952 includes a tagging system 956 that assigns tags to data 960 from the source data 948. The tags are based on tenant information 964 and may be as simple as a tenant ID for each object or block of the data 960.

Passport and Visa

FIGS. 10-13 are examples of passports (such as the passport 748, the passport 788, the passport 940) and visas (such as the visa 226) that may be used in accordance with the principles of the present disclosure. A passport is an electronic document used to establish or prove a user's identity and to control the user's data permissions. A passport includes a set of data credentials for a specified user, including authentication and data authorization information. In some instances, a user's data-related credentials may be fragmented across multiple security and privacy components, applications, and/or data assets. A passport is configured to consolidate security and privacy information so that a user's data-related credentials are stored in a single document. A passport simplifies user data management and enforcement.

In some instances, each user will have their own centrally managed passport. A user may include a human, a system, a service, a bot, a device, etc. A passport may be carried with a user, distributed ahead of time to local data assets, and/or requested as needed during a digital interaction. A user connected to a computer network and requesting a data action (e.g., data access, data visibility, data sharing, data use, etc.) will be allowed or denied that action via security enforcement controls based on the data credentials in their passport and/or visa.

Data access may refer to security controls restricting user access to only data for which they are authorized. Data access restrictions may include, as examples, tenant level data access restrictions, offshore data access restrictions, system and organization controls 2 (SOC-2) data access restrictions, data fencing restrictions, and/or selective/named user access restrictions, among others. Data visibility may refer to sensitive data being de-identified at rest with security controls in place restricting unauthorized users from accessing re-identified data. Data visibility restrictions may include data de-identification/re-identification restrictions, and/or sensitive data visibility restrictions, among others. Data sharing may refer to security controls restricting unauthorized users to share certain data. Data use may refer to security controls restricting the use of data beyond its contracted and/or regulatory terms. Data use restrictions may include data aggregation restrictions, Department of Defense (DoD) prohibitions, offshore services restrictions, direct to customer communications restrictions, and/or data monetization restrictions, among others.

Figure 10:
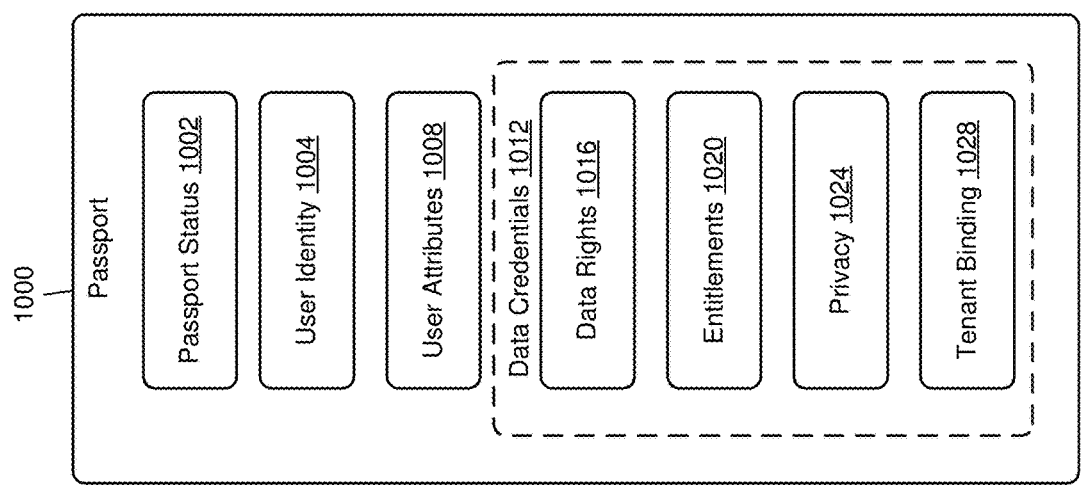
FIG. 10 is a schematic view of an example passport.

FIG. 10 graphically depicts an example data structure of a passport 1000, including a passport status portion 1002, a user identity portion 1004, a user attributes portion 1008, and a data credentials portion 1012. The passport status portion 1002 includes information pertaining to the current status of the passport. The user identity portion 1004 includes information that is unique to the user associated with the passport. The user attributes portion 1008 includes information that further describes the user. The data credentials portion 1012 includes information pertaining to the data credentials of the user. The data credentials portion 1012 may include a data rights portion 1016, an entitlements portion 1020, a privacy portion 1024, and a tenant binding portion 1028.

Figure 11:
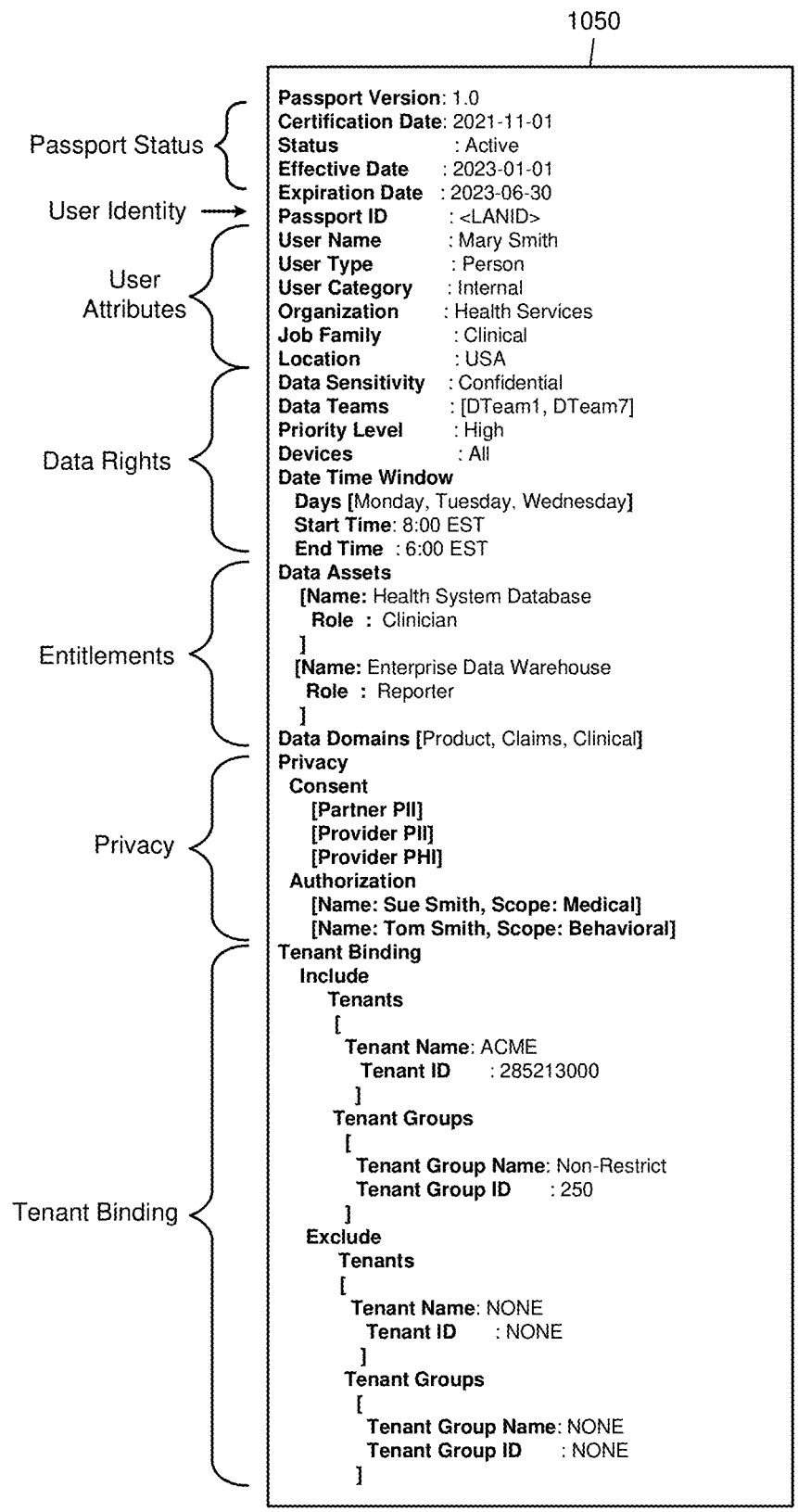
FIG. 11 is an illustration of sample data for the example passport of FIG. 10.

In FIG. 11, an illustration 1050 of the passport 1000 with sample values includes the passport version (e.g., 1.0), the passport certification date (e.g., 2021-11-01), the passport status (e.g., Active), the passport effective date (e.g., 2023-01-01), and the passport expiration date (e.g., 2023-06-30). The user identity portion 1004 includes the user's unique username and/or ID (e.g., <LANID>). The user attributes portion 1008 may include the user's name (e.g., Mary Smith), the user's type (e.g., Person), the user's category classification (e.g., Internal), the user's organization (e.g., Health Services), the user's job family (e.g., Clinical), and the user's location (e.g., USA).

The data rights portion 1016 may include the user's data sensitivity access level (e.g., Confidential), a set of teams the user has the data rights of (e.g., a set including DTeam 1 and DTeam 7), the user's priority level classification (e.g., High), a set of devices that the user is able to access data from (e.g., All), and the days of the week the user is authorized to access data (e.g., Monday, Tuesday, Wednesday), including the start time (e.g., 8:00 am EST) and the end time (e.g., 6:00 pm EST) on those days. In some instances, a user may be restricted from accessing data via certain devices (e.g., a smart phone, a tablet, a non-Windows device, etc.).

The data entitlements portion 1020 may include a set of data assets that the user is authorized to access (e.g., Health System Database, Enterprise Data Warehouse) and the user's role within the data assets (e.g., Clinician, Reporter). The user's role may be associated with the user's data rights. For instance, a reporter may be authorized to access, view, and share data, whereas a clinician may only be authorized to access and view data.

The privacy portion 1024 may include a set of parties for which the user has consent to access their data—for example, Partner personal identifiable information (PII), Provider PII, Provider protected health information (PHI)—and a set of individuals that the user has authorization to access their data (e.g., Sue Smith and Tom Smith). The tenant binding portion 1028 may include a set of tenants (e.g., ACME, ID No. 285213000) and a set of tenant groups (e.g., Non-Restrict, ID No. 250) that the user is authorized to access their data. In some instances, the privacy portion 1024 may include a set of tenant exclusions (e.g., None) and a set of tenant group exclusions (e.g., None) that the user is restricted from accessing their data.

Figure 12:
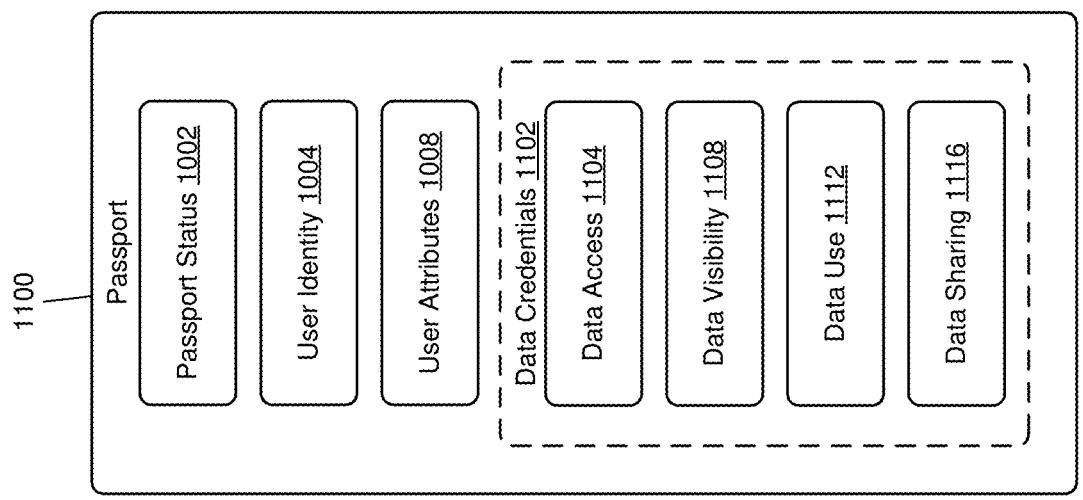
FIG. 12 is a schematic view of an additional example passport.

FIG. 12 graphically depicts an example data structure of a passport 1100, including a passport status portion 1002, a user identity portion 1004, a user attributes portion 1008, and a data credentials portion 1102. The data credentials portion 1102 may include a data access portion 1104, a data visibility portion 1108, a data use portion 1112, and a data sharing portion 1116.

Figure 13:
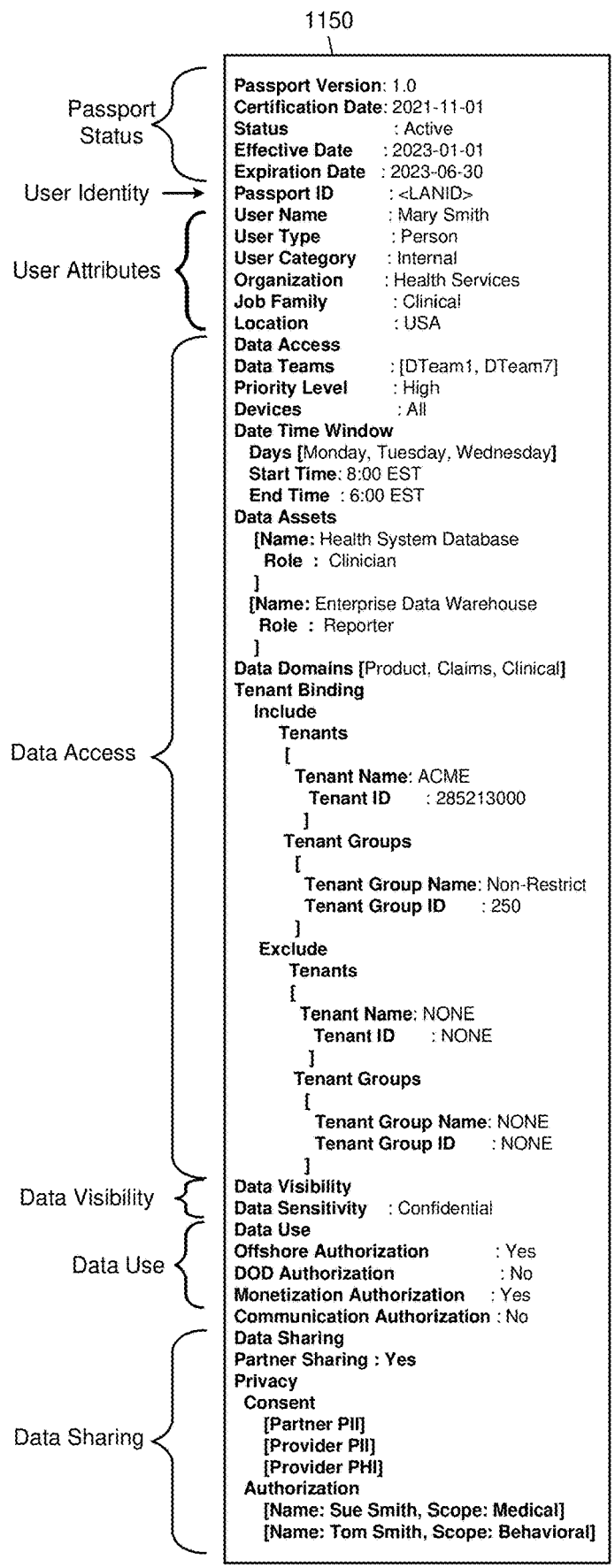
FIG. 13 is an illustration of sample data for the example passport of FIG. 12.

In FIG. 13, an illustration 1150 of the passport 1100 with sample values includes a data access portion 1104. The data access portion 1104 includes a set of teams the user has the data rights for (e.g., the set of DTeam 1 and DTeam 7), the user's priority level classification (e.g., High), a set of devices that the user is able to access data from (e.g., All), the days of the week the user is authorized to access data (e.g., Monday, Tuesday, Wednesday), including the start time (e.g., 8:00 am EST) and the end time (e.g., 6:00 pm EST) on those days, a set of data assets that the user is authorized to access (e.g., Health System Database, Enterprise Data Warehouse) and the user's role within the data assets (e.g., Clinician, Reporter), a set of tenants (e.g., ACME, ID No. 285213000) and a set of tenant groups (e.g., Non-Restrict, ID No. 250) that the user is authorized to access their data, and a set of tenant exclusions (e.g., None) and a set of tenant group exclusions (e.g., None) that the user is restricted from accessing their data.

The data visibility portion 1108 may include the user's data sensitivity access level (e.g., Confidential). The data use portion 1112 may include the user's offshore authorization (e.g., Yes), the user's DOD authorization (e.g., No), the user's monetization authorization (e.g., Yes), and the user's communication authorization (e.g., No). The data sharing portion 1116 may include the user's partner sharing authorization (e.g., Yes), a set of parties that the user has consent to access their data (e.g., Partner PII, Provider PII, Provider PHI) and a set of individuals that the user has authorization to access their data (e.g., Sue Smith and Tom Smith).

Figure 14:
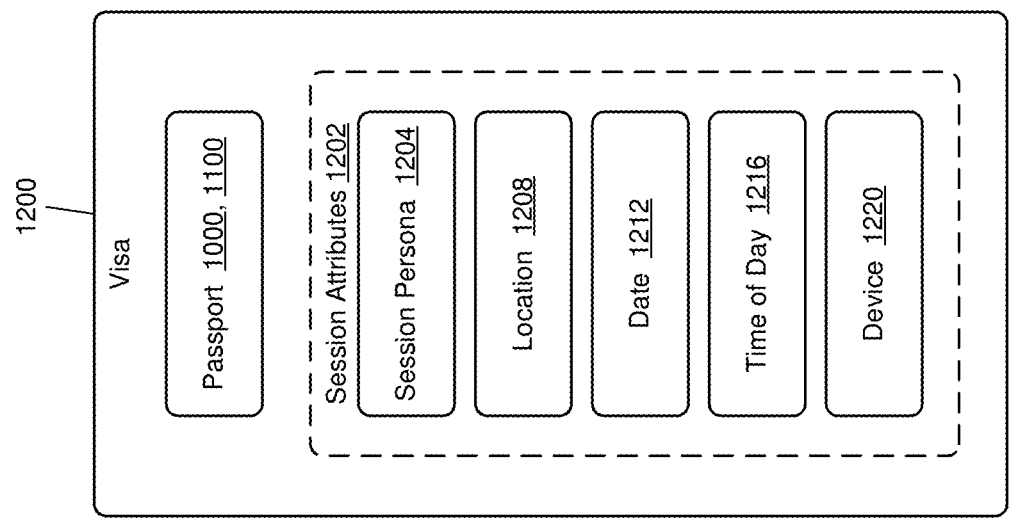
FIG. 14 is a schematic view of an example visa.

FIG. 14 graphically depicts an example data structure of a visa 1200. A visa is an electronic document used to prove a user's identity and control the user's data permissions. In some examples, a visa may be a temporary runtime version of a passport combined with dynamic session level attributes to further define the user's credentials for the duration of a user session. A visa may be generated for each user session, for instance, if dynamic session level attributes are required for authorization, and a visa may expire upon termination of the session.

A visa may include similar information as a passport plus a set of session attributes 1202. The session attributes 1202 may include the user's session persona 1204, the user's current location 1208, the current date 1212, the current time of day 1216, and identification of the user's device 1220. In some examples, a user may be restricted from accessing data if the user is located offshore (e.g., outside of USA). As another example, a user may be restricted from accessing data on certain days and/or during certain times of day. In some instances, a user may be restricted from accessing data via certain devices (e.g., a smart phone, a tablet, a non-Windows device, etc.).

The following logic examples may be used to enforce certain restrictions of a passport and/or a visa in a relational database, either as a row-level security policy or a view. The below enforcement examples may be consolidated in one set of logic: for example, joined by logical AND operators. Similar logic may be implemented in other data assets such as object storage where the metadata could be object tags with the logic in an IAM policy.

In the following example, a user can only access data during a certain window of time. The Customer table stores business data. The User Attribute table stores passport information for all users including their time window to access data. The user connects to the data asset and the USER_ID value is set in the variable: DBUSER. The DBUSER value matches one row in the User Attribute table. The user is only allowed access to Customer data if they are within the time window.

```
select customer.*
from
customer
,user_attribute
where user_attribute.user_id                 = DBUSER
and date_part('hour', CURRENT_TIME) between user_attribute.start_time and
user_attribute.end_time;
```

In the following example, a user is restricted from accessing data if they are located offshore (for example, outside of the location of the data, such as the United States). The Customer table includes business data. The Customer metadata table contains information including the location of users who can access their data. The User Attribute table contains passport information for all users including their location. The user connects to the data asset and the USER_ID value is set in the variable: DBUSER. The DBUSER value matches one row in the User Attribute table. The user is only allowed access to Customer rows where the User Attribute location matches the Customer Metadata location or where the Customer Metadata location is "ALL" meaning that the Customer row does not have a location restriction.

```
select customer.*
from
customer
,customer_metadata
,user_attribute
where customer.customer_id       = customer_metadata.customer_id
and user_attribute.user_id       = DBUSER
and (customer_metadata.location  = user_attribute.location
or
customer_metadata.location = 'ALL'
);
```

In the following example, a user can only access data in their organization unless they can see "ALL" data. The Customer table includes business data. The Customer metadata table includes information including the organization which owns the data. The User Attribute table includes passport information for all users including their organization or "ALL". The user connects to the data asset and the USER_ID value is set in the variable: DBUSER. The DBUSER value matches one row in the User Attribute table. The user is only allowed access to Customer rows where the User Attribute organization matches the Customer Metadata organization or where the user's organization is "ALL" which means the user has access to all Customer data regardless of organization.

```
select customer.*
from
customer
,customer_metadata
,user_attribute
where customer.customer_id       = customer_metadata.customer_id
and user_attribute.user_id       = DBUSER
and (customer_metadata.organization = user_attribute.organization
or
user_attribute.organization = 'ALL'
);
```

In the following example, a user can only access tenant data for which they have been assigned. The Customer table includes business data and a tenant identifier for each data row. The Tenant table includes tenant information including tenant_id and tenant_group_id. The User Attribute table includes passport information for all users including their assigned tenants and tenant groups. The user connects to the data asset and the USER_ID is set in the data asset variable: DBUSER. The DBUSER value matches one row in the User Attribute table. The user is only allowed access to Customer rows where the User Attribute tenant or tenant group is a match.

"coupled." Unless explicitly described as being "direct," when a relationship between first and second elements is described in the above disclosure, that relationship encompasses a direct relationship where no other intervening elements are present between the first and second elements as well as an indirect relationship where one or more intervening elements are present (either spatially or functionally) between the first and second elements.

```
select b.*
from
customer     as b
,tenant                          as t
,user_attribute                  as a
where b.tenant_id                = t.tenant_id
and a.user_id                                         = DBUSER
and (a.tenant_include_list                 = '=ALL='
or
a.tenant_include_list            like concat('%','=',t.tenant_id,'=','%')
or
a.tenant_group_include_list      = '=ALL='
or
a.tenant_group_include_list      like
concat('%','=',t.tenant_group_id,'=','%')
)
and (
(a.tenant_exclude_list           = '=NONE='
  or
a.tenant_exclude_list            not like concat('%','=',t.tenant_id,'=','%')
)
and
   (a.tenant_group_exclude_list ='=NONE='
or
a.tenant_group_exclude_list not like
concat('%','=',t.tenant_group_id,'=','%')
   )
);
```

CONCLUSION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. In the written description and claims, one or more steps within a method may be executed in a different order (or concurrently) without altering the principles of the present disclosure. Similarly, one or more instructions stored in a non-transitory computer-readable medium may be executed in a different order (or concurrently) without altering the principles of the present disclosure. Unless indicated otherwise, numbering or other labeling of instructions or method steps is done for convenient reference, not to indicate a fixed order.

Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and The phrase "at least one of A, B, and C" should be construed to mean a logical (A OR B OR C), using a non-exclusive logical OR, and should not be construed to mean "at least one of A, at least one of B, and at least one of C." The term "set" does not necessarily exclude the empty set—in other words, in some circumstances a "set" may have zero elements. The term "non-empty set" may be used to indicate exclusion of the empty set—in other words, a non-empty set will always have one or more elements. The term "subset" does not necessarily require a proper subset. In other words, a "subset" of a first set may be coextensive with (equal to) the first set. Further, the term "subset" does not necessarily exclude the empty set—in some circumstances a "subset" may have zero elements.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" can be replaced with the term "controller" or the term "circuit." In this application, the term "controller" can be replaced with the term "module."

The term "module" may refer to, be part of, or include processor hardware (shared, dedicated, or group) that executes code and memory hardware (shared, dedicated, or group) that stores code executed by the processor hardware.

The module may include one or more interface circuit(s). In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2020 (also known as the WIFI wireless networking standard) and IEEE Standard 802.3-2018 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module. For example, the client module may include a native or web application executing on a client device and in network communication with the server module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

The memory hardware may also store data together with or separate from the code. Shared memory hardware encompasses a single memory device that stores some or all code from multiple modules. One example of shared memory hardware may be level 1 cache on or near a microprocessor die, which may store code from multiple modules. Another example of shared memory hardware may be persistent storage, such as a solid state drive (SSD) or magnetic hard disk drive (HDD), which may store code from multiple modules. Group memory hardware encompasses a memory device that, in combination with other memory devices, stores some or all code from one or more modules. One example of group memory hardware is a storage area network (SAN), which may store code of a particular module across multiple physical devices. Another example of group memory hardware is random access memory of each of a set of servers that, in combination, store code of a particular module.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. Such apparatuses and methods may be described as computerized apparatuses and computerized methods. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A computerized method comprising:
receiving, from a user, a request to perform an operation on data stored in a shared data resource, wherein the shared data resource stores physically integrated data from a plurality of tenants;
obtaining a credential document from the user, wherein:
the credential document includes (i) a session portion that is specific to a current session of the user and (ii) a set of restriction criteria, and
the set of restriction criteria identifies a set of permitted user computing device types;

determining whether the user is authorized to access the shared data resource storing the data associated with the request based on a role attribute specified by the credential document; and in response to the user having access to the shared data resource storing the data:

determining, using user attributes in the credential document, a set of tenants whose data the user is authorized to access to perform the operation of the request;

evaluating, selectively based on the session portion, whether the set of restriction criteria restricts the user from performing the operation;

in response to the evaluating identifying that a current computing device of the user is not included in the set of permitted user computing device types, restricting the user from performing the operation; and in response to the evaluating identifying that the user is not restricted from performing the operation, performing the operation on a subset of the shared data resource, wherein the subset is limited to data stored in the shared data resource that corresponds to the set of tenants.

2. The method of claim 1 wherein the current session of the user is associated with a single authentication event of the user.

3. The method of claim 1 wherein the current session of the user is associated with a single user session.

4. The method of claim 3 wherein the single user session is a browser session of the user.

5. The method of claim 1 wherein the session portion includes a location of the user.

6. The method of claim 5 wherein:
the set of restriction criteria includes a same-jurisdiction requirement; and
the evaluating identifies that the user is restricted from performing the operation in response to the location diverging from a defined location of the shared data resource.

7. The method of claim 1 wherein:
the set of restriction criteria includes a range of times of day; and
the evaluating identifies that the user is restricted from performing the operation in response to a current time falling outside the range of times of day.

8. The method of claim 1 wherein:
the set of restriction criteria includes a type of use restriction specifying a set of permitted use types; and
the evaluating identifies that the user is restricted from performing the operation in response to a type of the operation being disjoint with the set of permitted use types.

9. The method of claim 1 wherein:
the set of restriction criteria includes a user persona identification;
the user persona identification is associated with a set of authorized operations; and
the evaluating identifies that the user is restricted from performing the operation in response to the operation being disjoint with the set of authorized operations.

10. The method of claim 1 wherein:
the set of restriction criteria includes a set of permitted parties on whose data the user has consent to perform an operation; and the evaluation identifies that the user is restricted from performing the operation in response to the operation encompassing data of a party not included in the set of permitted parties.

11. The method of claim 1 wherein:
the set of restriction criteria includes a data sharing authorization and a confidential data access authorization;
the evaluation identifies that the user is restricted from performing the operation in response to the operation including a data sharing operation and the data sharing authorization being negative; and
the evaluation identifies that the user is restricted from performing the operation in response to the data including confidential data and the confidential data access authorization being negative.

12. The method of claim 1 wherein:
each criterion in the set of restriction criteria is independent of session-specific values; and
the evaluating ignores the session portion.

13. The method of claim 1 wherein the session portion is populated in the credential document in response to at least one of:
creation of the current session of the user; and
successful authentication of the user.

14. The method of claim 13 wherein the session portion is cleared in the credential document in response to closing of the current session of the user.

15. The method of claim 1 wherein:
the set of restriction criteria includes a privacy indicator; and
the evaluation identifies that the user is restricted from performing the operation in response to the operation incorporating disaggregated data and the privacy indicator establishing that the user is not entitled to private data.

16. The method of claim 1 wherein:
the set of restriction criteria includes a visibility indicator; and
the evaluation identifies that the user is restricted from performing the operation in response to the operation revealing disaggregated data to the user and the visibility indicator establishing that the user is not entitled to view data.

17. The method of claim 1 wherein the credential document specifies a time of expiration.

18. The method of claim 1 wherein the credential document includes an electronic security document configured to prove identity of the user.

19. A system comprising:
memory hardware configured to store instructions; and
processor hardware configured to execute the instructions, wherein the instructions include:
receiving, from a user, a request to perform an operation on data stored in a shared data resource, wherein the shared data resource stores physically integrated data from a plurality of tenants;
obtaining a credential document from the user, wherein:
the credential document includes (i) a session portion that is specific to a current session of the user and (ii) a set of restriction criteria, and
the set of restriction criteria identifies a set of permitted user computing device types;

determining whether the user is authorized to access the shared data resource storing the data associated with the request based on a role attribute specified by the credential document; and in response to the user having access to the shared data resource storing the data:

determining, using user attributes in the credential document, a set of tenants whose data the user is authorized to access to perform the operation of the request;

evaluating, selectively based on the session portion, whether the set of restriction criteria restricts the user from performing the operation;

in response to the evaluating identifying that a current computing device of the user is not included in the set of permitted user computing device types, restricting the user from performing the operation; and in response to the evaluating identifying that the user is not restricted from performing the operation, performing the operation on a subset of the shared data resource, wherein the subset is limited to data stored in the shared data resource that corresponds to the set of tenants.

\* \* \* \* \*